US012669976B2

(12) United States Patent
Figueira et al.

(10) Patent No.: US 12,669,976 B2
(45) Date of Patent: Jun. 30, 2026

(54) ADJUSTABLE MOUNTING ASSEMBLY

(71) Applicant: Sonos, Inc., Santa Barbara, CA (US)

(72) Inventors: Ernesto Figueira, Santa Barbara, CA (US); Jennie Block, Santa Barbara, CA (US); Lyford Pierson Beverage, Jr., Tewksbury, MA (US); Edward Allan Krouse, Melrose, MA (US); Ayoush Mani Acharya Dixit, Goleta, CA (US); Mark S. Viscusi, Wrentham, MA (US); Douglas John Button, Simi Valley, CA (US); Kylie Muntean, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 170 days.

(21) Appl. No.: 18/478,312

(22) Filed: Sep. 29, 2023

(65) Prior Publication Data

US 2024/0111486 A1 Apr. 4, 2024

Related U.S. Application Data

(60) Provisional application No. 63/450,306, filed on Mar. 6, 2023, provisional application No. 63/412,039, filed on Sep. 30, 2022.

(51) Int. Cl.
G06F 3/16 (2006.01)
F16M 11/14 (2006.01)
(Continued)

(52) U.S. Cl.
CPC .............. G06F 3/165 (2013.01); H04R 3/04 (2013.01); F16M 11/14 (2013.01); F16M 13/022 (2013.01);
(Continued)

(58) Field of Classification Search
CPC ........... G06F 3/165; H04R 3/04; H04R 1/026; H04R 2201/021; H04R 2201/025; F16M 11/14; F16M 2200/024; F16M 13/022
See application file for complete search history.

(56) References Cited

U.S. PATENT DOCUMENTS

| | | | |
|---|---|---|---|
| 5,440,644 A | 8/1995 | Farinelli et al. | |
| 5,649,256 A * | 7/1997 | Wen ...................... | F16M 11/14 |
| | | | 396/428 |

(Continued)

FOREIGN PATENT DOCUMENTS

| | | |
|---|---|---|
| EP | 1389853 A1 | 2/2004 |
| JP | 2002181028 A | 6/2002 |

(Continued)

OTHER PUBLICATIONS

International Bureau, International Preliminary Report on Patentability, mailed on Apr. 10, 2025, issued in connection with International Application No. PCT/US2023/075528, filed on Sep. 29, 2023, 8 pages.

(Continued)

*Primary Examiner* — Carolyn R Edwards
*Assistant Examiner* — Kuassi A Ganmavo

(57) ABSTRACT

An adjustable mounting assembly includes (i) a housing with front and rear collars joined by a threaded engagement, the rear collar including teeth oriented toward the front collar, (ii) a front body part extending outwardly through an opening in the front collar, (iii) an intermediate body part coupled to the front body part, and (iv) a rear body part coupled to the intermediate body part, the rear body part including teeth oriented toward the rear collar, the mounting assembly adjustable such that (a) when the threaded engagement is tightened, the teeth of the rear body part are positioned in an interlocking engagement with the teeth of the rear collar, preventing rotation about a pitch axis of the (Continued)

mounting assembly, and (b) when the threaded engagement is loosened, the teeth of the rear body part are disengageable from the teeth of the rear collar, allowing rotation about the pitch axis.

20 Claims, 22 Drawing Sheets

(51) Int. Cl.

| | |
|---|---|
| *F16M 13/02* | (2006.01) |
| *H04R 1/02* | (2006.01) |
| *H04R 3/04* | (2006.01) |

(52) U.S. Cl.
CPC ....... *F16M 2200/024* (2013.01); *H04R 1/026* (2013.01); *H04R 2201/021* (2013.01); *H04R 2201/025* (2013.01)

(56) References Cited

U.S. PATENT DOCUMENTS

| | | | |
|---|---|---|---|
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollström et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,903,526 | B2 | 12/2014 | Beckhardt et al. |
| 8,942,252 | B2 | 1/2015 | Balassanian et al. |
| 8,995,240 | B1 | 3/2015 | Erven et al. |
| 9,042,556 | B2 | 5/2015 | Kallai et al. |
| 9,264,839 | B2 | 2/2016 | Oishi et al. |
| 9,512,954 | B2 | 12/2016 | Gerlovin |
| 9,982,832 | B1 * | 5/2018 | Nicolas .............. F16M 11/2014 |
| 10,007,481 | B2 | 6/2018 | Daly et al. |
| 10,114,605 | B2 | 10/2018 | Gossain et al. |
| 10,372,406 | B2 | 8/2019 | Wilberding et al. |
| 11,106,423 | B2 | 8/2021 | Kadri et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0092702 | A1 * | 7/2002 | Combest .................. H04R 1/02 181/150 |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2009/0072110 | A1 * | 3/2009 | Yu ........................... B60R 11/02 248/309.1 |
| 2010/0193650 | A1 * | 8/2010 | Dittmer ................ F16M 11/041 248/222.51 |
| 2011/0094977 | A1 * | 4/2011 | Li .......................... F16C 11/106 211/26 |
| 2014/0191098 | A1 * | 7/2014 | Simpson ................ H04R 1/026 248/278.1 |
| 2017/0060524 | A1 * | 3/2017 | Daly ........................ G06F 3/165 |
| 2017/0337789 | A1 * | 11/2017 | Rosenkvist ............ F16M 13/02 |
| 2018/0343510 | A1 * | 11/2018 | Nicolas ................... H04R 1/026 |
| 2019/0113072 | A1 | 4/2019 | Chijoff et al. |
| 2020/0245088 | A1 * | 7/2020 | Po ............................... H04S 7/30 |
| 2021/0109423 | A1 * | 4/2021 | Ramones .............. F16M 13/02 |
| 2021/0328613 | A1 * | 10/2021 | Worcester .............. H04R 1/028 |
| 2022/0403976 | A1 * | 12/2022 | Morrison ............ F16M 13/027 |

FOREIGN PATENT DOCUMENTS

| | | |
|---|---|---|
| WO | 0041493 A2 | 7/2000 |
| WO | 0153994 A2 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Jan. 15, 2024, issued in connection with International Application No. PCT/US2023/075528, filed on Sep. 29, 2023, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

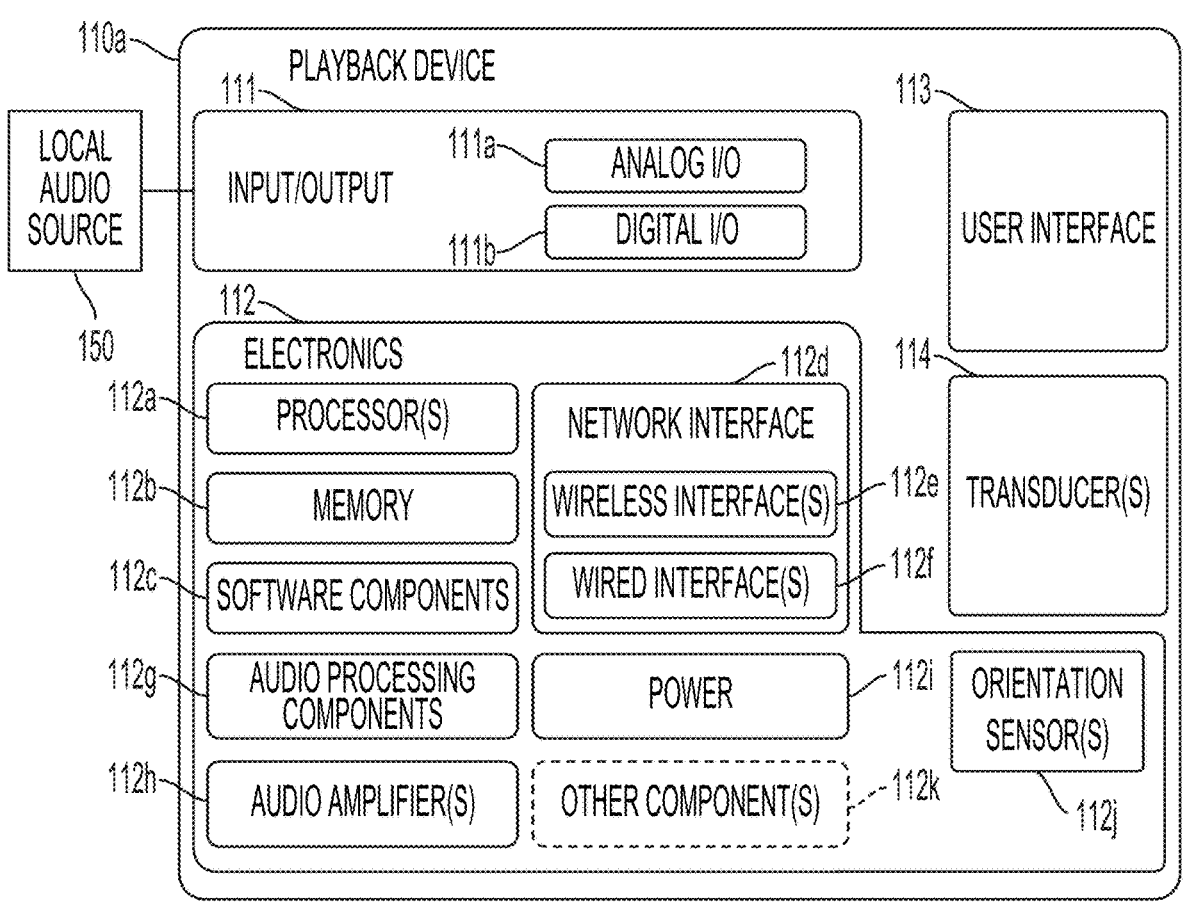
FIG. 1C
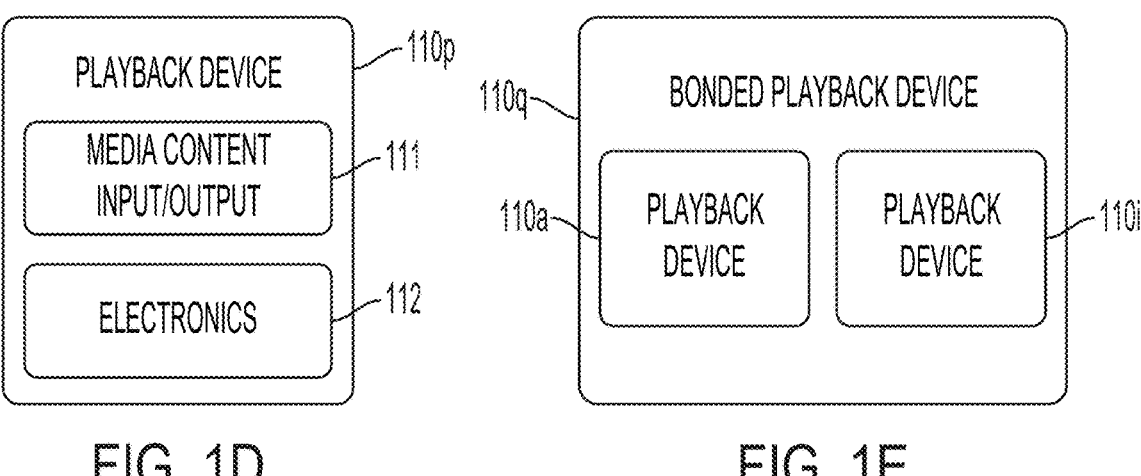
FIG. 1D            FIG. 1E

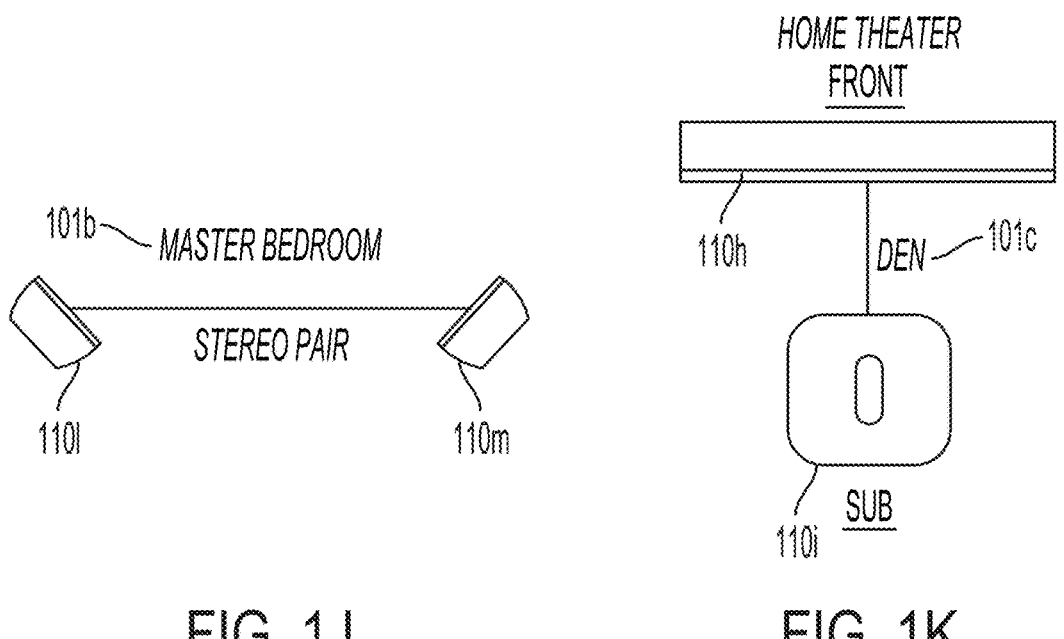
FIG. 1J
FIG. 1K
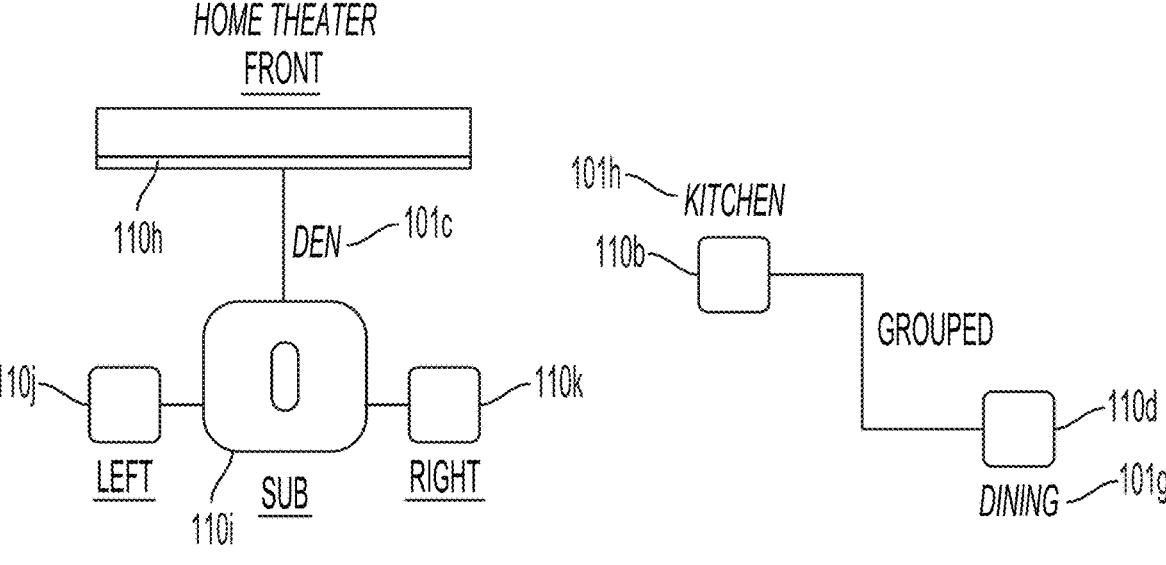
FIG. 1L
FIG. 1M

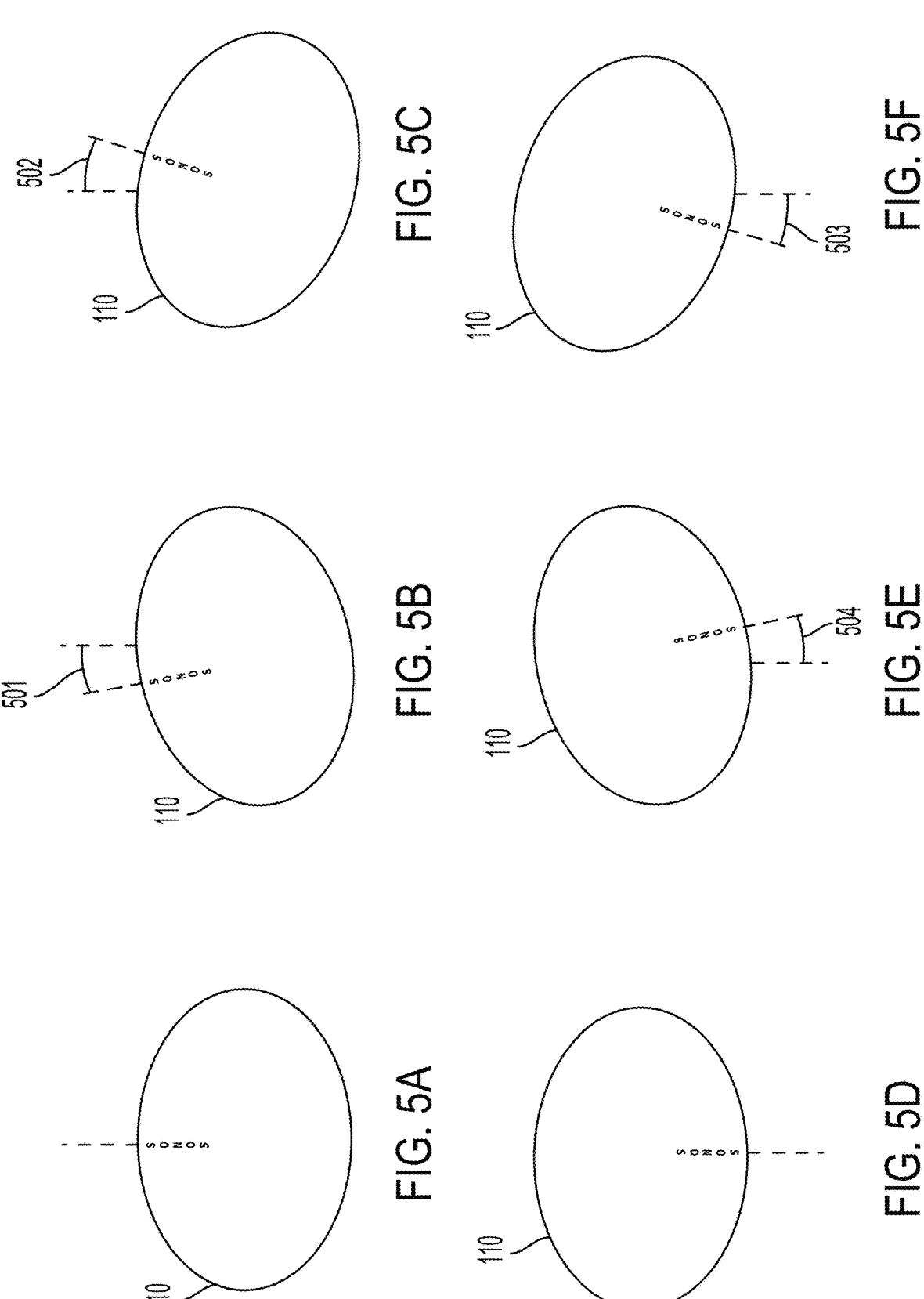

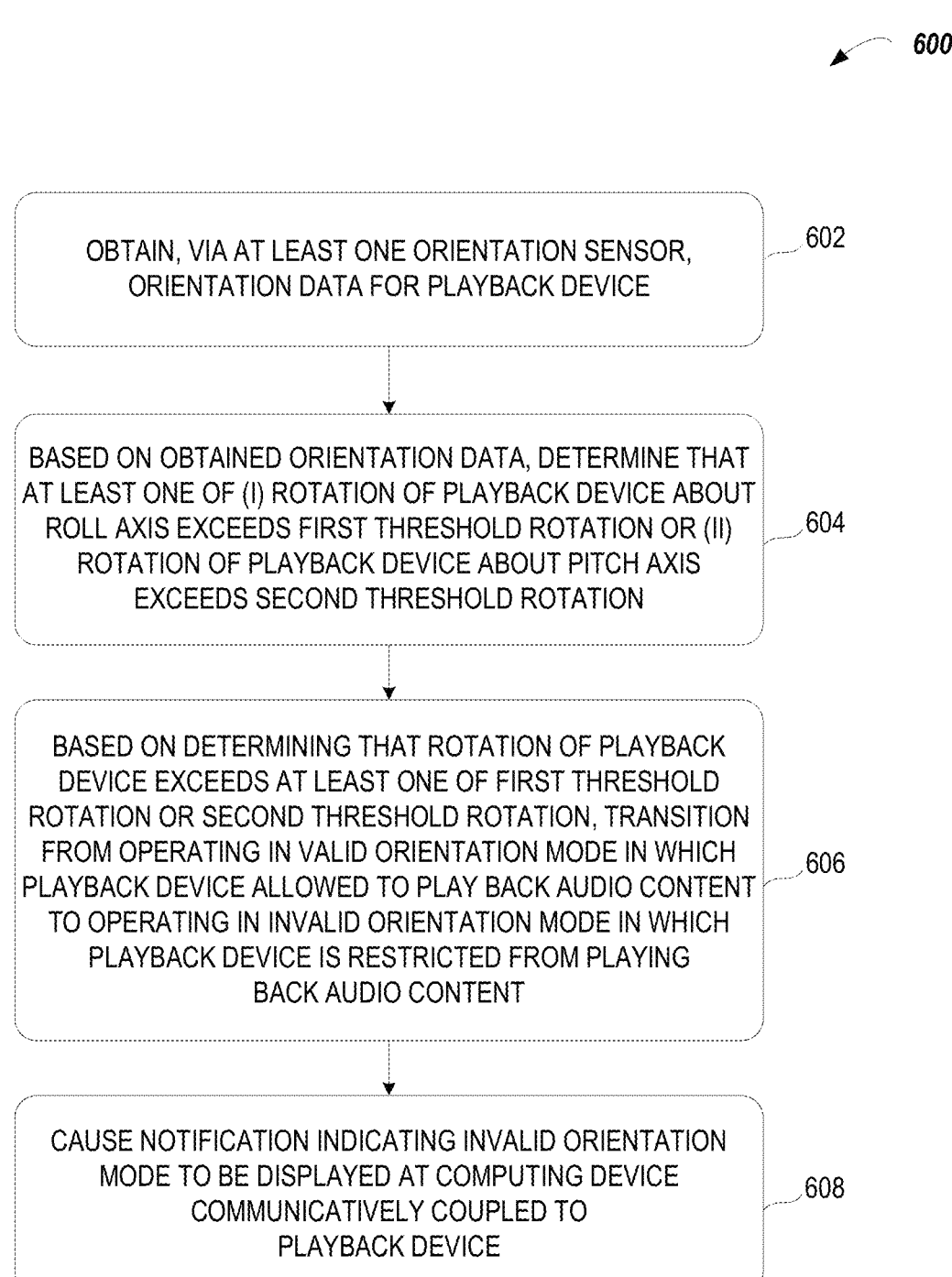

*600*

OBTAIN, VIA AT LEAST ONE ORIENTATION SENSOR, ORIENTATION DATA FOR PLAYBACK DEVICE — 602

BASED ON OBTAINED ORIENTATION DATA, DETERMINE THAT AT LEAST ONE OF (I) ROTATION OF PLAYBACK DEVICE ABOUT ROLL AXIS EXCEEDS FIRST THRESHOLD ROTATION OR (II) ROTATION OF PLAYBACK DEVICE ABOUT PITCH AXIS EXCEEDS SECOND THRESHOLD ROTATION — 604

BASED ON DETERMINING THAT ROTATION OF PLAYBACK DEVICE EXCEEDS AT LEAST ONE OF FIRST THRESHOLD ROTATION OR SECOND THRESHOLD ROTATION, TRANSITION FROM OPERATING IN VALID ORIENTATION MODE IN WHICH PLAYBACK DEVICE ALLOWED TO PLAY BACK AUDIO CONTENT TO OPERATING IN INVALID ORIENTATION MODE IN WHICH PLAYBACK DEVICE IS RESTRICTED FROM PLAYING BACK AUDIO CONTENT — 606

CAUSE NOTIFICATION INDICATING INVALID ORIENTATION MODE TO BE DISPLAYED AT COMPUTING DEVICE COMMUNICATIVELY COUPLED TO PLAYBACK DEVICE — 608

FIG. 6

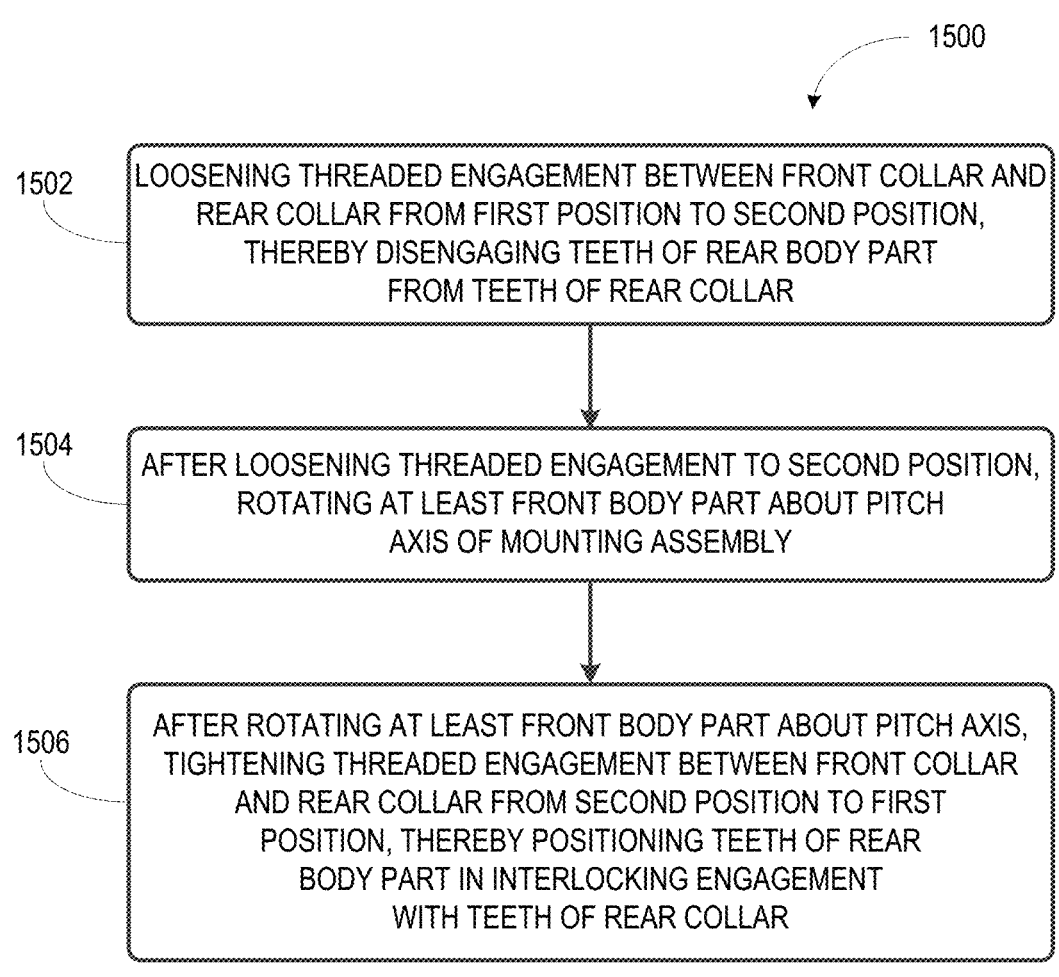

1500

1502   LOOSENING THREADED ENGAGEMENT BETWEEN FRONT COLLAR AND REAR COLLAR FROM FIRST POSITION TO SECOND POSITION, THEREBY DISENGAGING TEETH OF REAR BODY PART FROM TEETH OF REAR COLLAR

1504   AFTER LOOSENING THREADED ENGAGEMENT TO SECOND POSITION, ROTATING AT LEAST FRONT BODY PART ABOUT PITCH AXIS OF MOUNTING ASSEMBLY

1506   AFTER ROTATING AT LEAST FRONT BODY PART ABOUT PITCH AXIS, TIGHTENING THREADED ENGAGEMENT BETWEEN FRONT COLLAR AND REAR COLLAR FROM SECOND POSITION TO FIRST POSITION, THEREBY POSITIONING TEETH OF REAR BODY PART IN INTERLOCKING ENGAGEMENT WITH TEETH OF REAR COLLAR

FIG. 15

ADJUSTABLE MOUNTING ASSEMBLY

CROSS-REFERENCE TO RELATED APPLICATIONS

This application claims priority to U.S. Provisional Application No. 63/450,306, filed Mar. 6, 2023 and titled "Playback Device Invalid Orientation Detection and Feedback," and U.S. Provisional Application No. 63/412,039, filed Sep. 30, 2022 and titled "Adjustable Mounting Assembly," the contents of each of which are incorporated by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of an example playback device.

FIG. 1D is a block diagram of an example playback device.

FIG. 1E is a block diagram of an example playback device.

FIGS. 1J through 1M are schematic diagrams of example media playback system zones.

FIG. 5A is a front view of an example playback device oriented without rotation about a roll axis of the playback device.

FIG. 5B is a front view of the example playback device of FIG. 5A oriented at a maximum counterclockwise rotation about the roll axis of the playback device.

FIG. 5C is a front view of the example playback device of FIG. 5A oriented at a maximum clockwise rotation about the roll axis of the playback device.

FIG. 5D is a front view of the example playback device of FIG. 5A oriented in an inverted position.

FIG. 5E is a front view of the example playback device of FIG. 5A oriented at a maximum counterclockwise rotation, from the inverted position, about the roll axis of the playback device.

FIG. 5F is a front view of the example playback device of FIG. 5A oriented at a maximum clockwise rotation, from the inverted position, about the roll axis of the playback device.

FIG. 6 is a flowchart showing example operations for detecting and handling a playback device that has been placed in an invalid orientation.

FIG. 15 shows an example flowchart for adjusting an adjustable mounting assembly, according to an example embodiment.

Figure 1A:
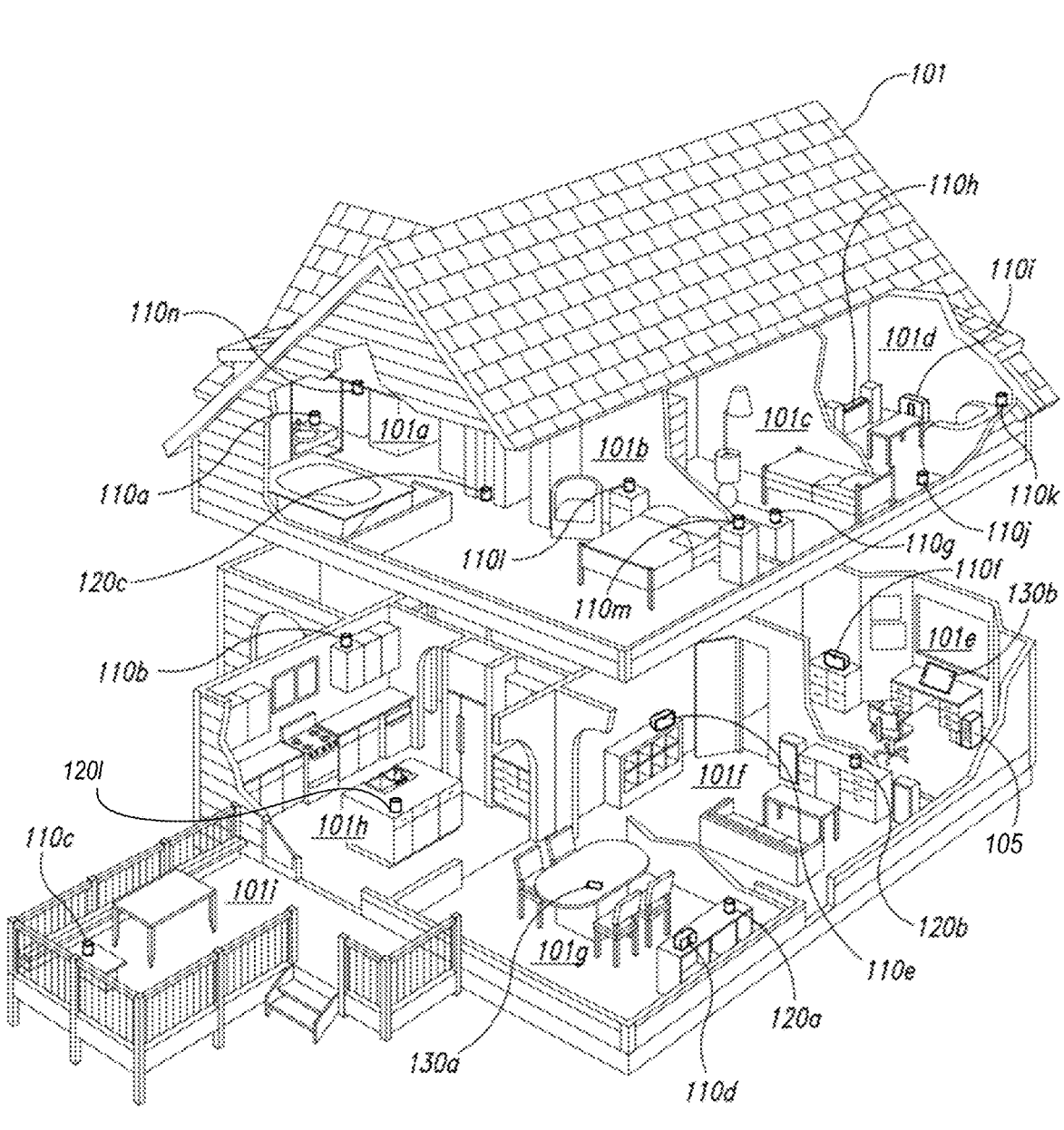
FIG. 1A is a partial cutaway view of an environment having a media playback system configured in accordance with aspects of the disclosed technology.

The drawings are for the purpose of illustrating example embodiments and are not necessarily to scale. Those of ordinary skill in the art will understand that the technology disclosed herein is not limited to the arrangements and/or instrumentalities shown in the drawings.

DETAILED DESCRIPTION

I. Overview

Embodiments described herein relate to techniques for detecting and handling a playback device that has been placed in an invalid orientation. In this context, an invalid orientation for a playback device may represent a physical orientation that may have an undesirable effect on the audio output of the playback device. For example, an increasing number of playback devices for use within a home media playback system are being designed with upward-firing transducers that enable the output object-based audio content, whereby the playback device can direct some portions of the audio content upward to be reflected off of the ceiling of the listening environment (e.g., in a home theater context). However, if a playback device that includes such upward-firing transducers is rotated about its pitch axis too far upward or too far downward, its ability to direct sound in an upward direction may be adversely impacted. Consequently, it may be advantageous to avoid such an invalid orientation.

As another possibility, an invalid orientation for a playback device may represent a physical orientation of the playback device that is more susceptible to overheating, based on the layout of the physical hardware within the playback device. For instance, certain pitch and/or roll orientations of the playback device, or respective ranges of orientations, may be more conducive to cooling of certain components (e.g., a processor, etc.) than others, and/or may orient the playback device such that any edge-case thermal event that might occur remains contained within the housing of the playback device. Positioning the playback device outside of a valid pitch and/or roll orientation range may increase the playback device's susceptibility to such events, and thus it may be beneficial to avoid an invalid orientation for this reason as well.

For these and other reasons, a playback device may include one or more orientation sensors (e.g., an accelerometer) that it may use to determine its approximate orientation. For instance, a playback device may include an accelerometer that may provide an indication of a rotation of the playback device about one or more axes, such as a pitch axis of the playback device, a roll axis of the playback device. If, based on orientation data from the one or more orientation sensors, the playback device determines that it has rotated beyond a valid orientation range in one of these directions, the playback device may take one or more actions.

As one example, the playback device may take one or more actions to limit the audio playback capability of the playback device. For instance, this may involve reducing the volume of the playback device to a minimal level (e.g., fifteen percent) and imposing this as maximum volume level until the playback device is returned to a valid orientation. Alternatively, the one or more actions to limit the audio playback capability of the playback device may involve restricting the playback device from playing back any audio content until the playback device is returned to a valid orientation.

As another example, a playback device that determines it is in an invalid orientation may take one or more actions to notify a user of the invalid orientation. For instance, the playback device may provide a visual indication via its on-device user interface, such as an LED light illuminated in a particular color, to indicate the invalid orientation. Further, the playback device might provide, or cause another playback device to provide, an audio cue (e.g., a notification tone) to indicate the invalid orientation, separate from any reduction in playback volume or a complete termination of audio playback that might independently indicate the invalid orientation.

Further, in some implementations, the playback device may transmit an indication of the invalid orientation to a control device (e.g., a smartphone) that is running media playback system controller application software for controlling the playback device. This indication from the playback device may cause the control device to present one or more notifications via the controller application to inform a user of the invalid orientation. In some cases, the control device may provide instructions to the user for how to place the playback device in a valid orientation.

In this regard, the instructions for how to place the playback device in a valid orientation may be provided via the control device at various times, such as during an initial setup of the playback device so that the user is aware of the valid and invalid orientations. Thereafter, the control device may display the instructions for how to place the playback device in a valid orientation if the playback device is in an invalid orientation and the user initiates a further configuration of the playback device. For example, before allowing a user to continue with adding the playback device to a stereo pair or other bonded arrangement (e.g., a home theater), the control device may instruct the user to correct the invalid orientation. Similarly, before allowing a user to continue with an audio calibration of the playback device, the control device may instruct the user to correct the invalid orientation. Other examples are also possible.

In accordance with the above, in some example embodiments, disclosed herein is a method that involves a playback device (i) obtaining, via at least one orientation sensor of the playback device, orientation data for the playback device, (ii) based on the obtained orientation data, determining that at least one of (a) a rotation of the playback device about a roll axis of the playback device exceeds a first threshold rotation or (b) a rotation of the playback device about a pitch axis of the playback device exceeds a second threshold rotation, and (iii) based on determining that the rotation of the playback device exceeds at least one of the first threshold rotation or the second threshold rotation, transitioning from operating in a valid orientation mode in which the playback device is allowed to play back audio content to operating in an invalid orientation mode in which the playback device is restricted from playing back audio content.

In another aspect, disclosed herein is a playback device that includes at least one orientation sensor, at least one processor, a non-transitory computer-readable medium, and program instructions stored on the non-transitory computer-readable medium that are executable by the at least one processor such that the playback device is configured to carry out the functions disclosed herein, including but not limited to the functions of the foregoing method.

In yet another aspect, disclosed herein is a non-transitory computer-readable medium. The non-transitory computer-readable medium is provisioned with program instructions that, when executed by at least one processor, cause a playback device to carry out the functions disclosed herein, including but not limited to the functions of the foregoing method.

In some implementations, an adjustable mounting assembly that is designed for use with the playback device may be limited in its range of motion in a way that corresponds to the valid orientations of the playback device. In this way, the range of valid orientations for the playback device may be enforced when it is coupled to the adjustable mounting assembly. For instance, the playback device may include a mounting interface that includes one or more coupling parts (e.g., screw holes) that correspond to opposing coupling parts (e.g., screws) on a platform of an adjustable mounting assembly, such that the playback device may be coupled to the platform. The platform of the adjustable mounting assembly may in turn be mechanically limited in how far it may rotate in its pitch and/or roll directions.

Examples described herein involve an adjustable mounting assembly that may support an object having substantial weight while still providing the range of movement of a traditional ball joint. In particular, the adjustable mounting assembly discussed below may include a housing with an adjustable collar that may be loosened to permit movement of an internal mounting body with multiple degrees of freedom, and alternatively tightened to position the mounting body in an interlocking engagement with the collar, thereby preventing movement about at least one axis, such as a pitch axis.

Typically, a mounting assembly that utilizes a ball joint connection will provide a high degree of adjustability. The ball joint will generally hold the mounted object in a fixed position due to the friction of the ball against a socket, while still allowing rotation of the ball within the socket if enough force is applied to make an adjustment. Because of how the ball moves within the socket, adjustments may take the form of rotations about one or more of three different rotational axes including pitch, yaw, and roll. A common example of this type of mounting assembly is found in the rear-view mirror on the windshield of most cars, which allows the mirror to be rotated about one or more of a pitch axis (i.e., tilted up or down), a yaw axis (i.e., turned left of right), or a roll axis (i.e., rotated like a screw).

In many applications, a loudspeaker is an object that can benefit from being mounted in an adjustable way. For instance, in the context of a home media playback system, a user might want to place a loudspeaker (also referred to herein as an audio playback device, or playback device) at a particular location for listening purposes, but there may not be a convenience surface (e.g., a table, a shelf, etc.) upon which to place the playback device. One such example may involve a home theater arrangement where a set of playback devices may be placed at designated locations to create a particular surround sound effect. To arrange their playback devices in the correct locations, users will often mount one or more of the devices on a wall, or on a stand. Once mounted, the user may further wish to direct the output of the playback device in a particular direction, depending on the layout of the listening environment. Thus, the direction of the mount may be adjustable to allow for flexibility in this regard. In many implementations, a mounting assembly that includes a ball joint may be suitable for this purpose.

However, as expectations increase for high quality audio reproduction and highly feature-capable playback devices, the physical weight of such playback devices also increases due to the hardware requirements for achieving this level of quality. This, in turn, creates a problem for traditional ball joint type mounting attachments. In particular, the weight of the playback device may be too great for the friction of the ball joint to maintain the playback device in position once the user adjusts it to its desired orientation.

Some solutions to address this issue might involve increasing the radius of the ball to create a greater surface area, and thus more friction, in contact with the socket. However, as the weight of a playback devices increases (e.g., 8 pounds or more), the radius that would be required for the ball to achieve enough friction may increase to several inches or more, and eventually becomes impractical to implement in a mount. Alternatively, more rigid mounting options that can carry the weight of a relatively heavy playback device might be considered, but this may require sacrificing the adjustability that is often preferred for high quality audio playback configurations, and/or overcomplicating the mounting process in order to achieve suitable playback device placement(s).

To address these shortcomings, disclosed herein is a new adjustable mounting assembly that provides the adjustability of a traditional ball joint while also increasing the load carrying capacity of such an assembly. The adjustable mounting assembly may include a housing that includes a two-part collar that is joined by a threaded engagement. An approximately spherical, multi-part body may be positioned within the housing and surrounded by the two parts of the collar, with a stem that extends through an opening in the collar and provides the mounting interface (e.g., a platform) for the playback device. When the threaded engagement of the collar is loosened, the multi-part body may move freely, rotating in each of a pitch, yaw, and roll direction based on the interfaces between the component parts of the body. On the other hand, when the threaded engagement of the collar is tightened, the multi-part body may be positioned into an interlocking engagement with the collar such that rotation in the pitch axis is prevented. For instance, the multi-part body and the collar may include opposing teeth that are engaged when the collar is tightened, but disengaged when the collar is loosened.

In this way, the adjustable mounting assembly may support the weight of a playback device via the interlocking engagement of the multi-part body and the collar. Moreover, the interlocking engagement of the multi-part body and the collar can be achieved even if the multi-part body has been rotated in one or more directions when the collar is tightened, as will be discussed further below. Still further, despite the sophisticated inner workings, the adjustable mounting assembly approximates the ease of use and simplistic visual aesthetics of a traditional ball joint type mounting attachment.

As indicated above, the examples herein involve an adjustable mounting assembly that may support an object having substantial weight while still providing the range of movement of a traditional ball joint. In one aspect, an adjustable mounting assembly is provided that includes (i) a housing comprising a front collar and a rear collar joined by a threaded engagement, the front collar comprising an opening about a roll axis of the mounting assembly, the rear collar comprising teeth oriented toward the front collar, (ii) a front body part positioned within the housing and extending outwardly through the opening, (iii) an intermediate body part positioned within the housing and rotatably coupled, about the roll axis of the mounting assembly, to the front body part, and (iv) a rear body part positioned within the housing and rotatably coupled, about a yaw axis of the mounting assembly, to the intermediate body part, the rear body part comprising teeth oriented toward the rear collar, wherein the mounting assembly is adjustable such that (a) when the threaded engagement between the front collar and the rear collar is tightened to a first position, the teeth of the rear body part are positioned in an interlocking engagement with the teeth of the rear collar, thereby preventing the front body part from rotating about a pitch axis of the mounting assembly, and (b) when the threaded engagement between the front collar and the rear collar is loosened to a second position, the teeth of the rear body part are disengageable from the teeth of the rear collar, thereby allowing the front body part to rotate about the pitch axis of the mounting assembly.

In another aspect, a method of adjusting an adjustable mounting assembly is provided, the adjustable mounting assembly comprising (a) a housing comprising a front collar and a rear collar joined by a threaded engagement, the front collar comprising an opening about a roll axis of the mounting assembly, the rear collar comprising teeth oriented toward the front collar (b) a front body part positioned within the housing and extending outwardly through the opening, (c) an intermediate body part positioned within the housing and rotatably coupled, about the roll axis of the mounting assembly, to the front body part, and (d) a rear body part positioned within the housing and rotatably coupled, about a yaw axis of the mounting assembly, to the intermediate body part, the rear body part comprising teeth oriented toward the rear collar, where the method includes (i) loosening the threaded engagement between the front collar and the rear collar from a first position to a second position, thereby disengaging the teeth of the rear body part from the teeth of the rear collar and allowing the front body part to rotate about a pitch axis of the mounting assembly, (ii) after loosening the threaded engagement to the second position, rotating at least the front body part about the pitch axis of the mounting assembly, and (iii) after rotating at least the front body part about the pitch axis, tightening the threaded engagement between the front collar and the rear collar from the second position to the first position, thereby positioning the teeth of the rear body part in an interlocking engagement with the teeth of the rear collar and preventing the front body part from rotating about the pitch axis.

In yet another aspect, a system is provided. The system includes a playback device and an adjustable mounting assembly, the adjustable mounting assembly comprising (i) a front body part coupled to a platform for receiving a playback device, (ii) an intermediate body part rotatably coupled, about a roll axis of the adjustable mounting assembly, to the front body part, wherein rotation of the front body part about the roll axis of the adjustable mounting assembly is limited by an abutment of the front body part with the intermediate body part, and (iii) a rear body part coupled to the intermediate body part, wherein rotation of the front body part about a pitch axis of the adjustable mounting assembly is limited by an abutment of the rear body part with an interior wall of the adjustable mounting assembly, and wherein the playback device comprises a mounting interface for removably coupling the playback device to the platform of the adjustable mounting assembly, at least one orientation sensor, at least one processor, a non-transitory computer-readable medium, and program instructions stored on the non-transitory computer-readable medium that are executable by the at least one processor such that the playback device is configured to carry out the functions disclosed herein, including but not limited to the functions of the foregoing method.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Suitable Operating Environment a. Suitable Media Playback System

Figure 1B:
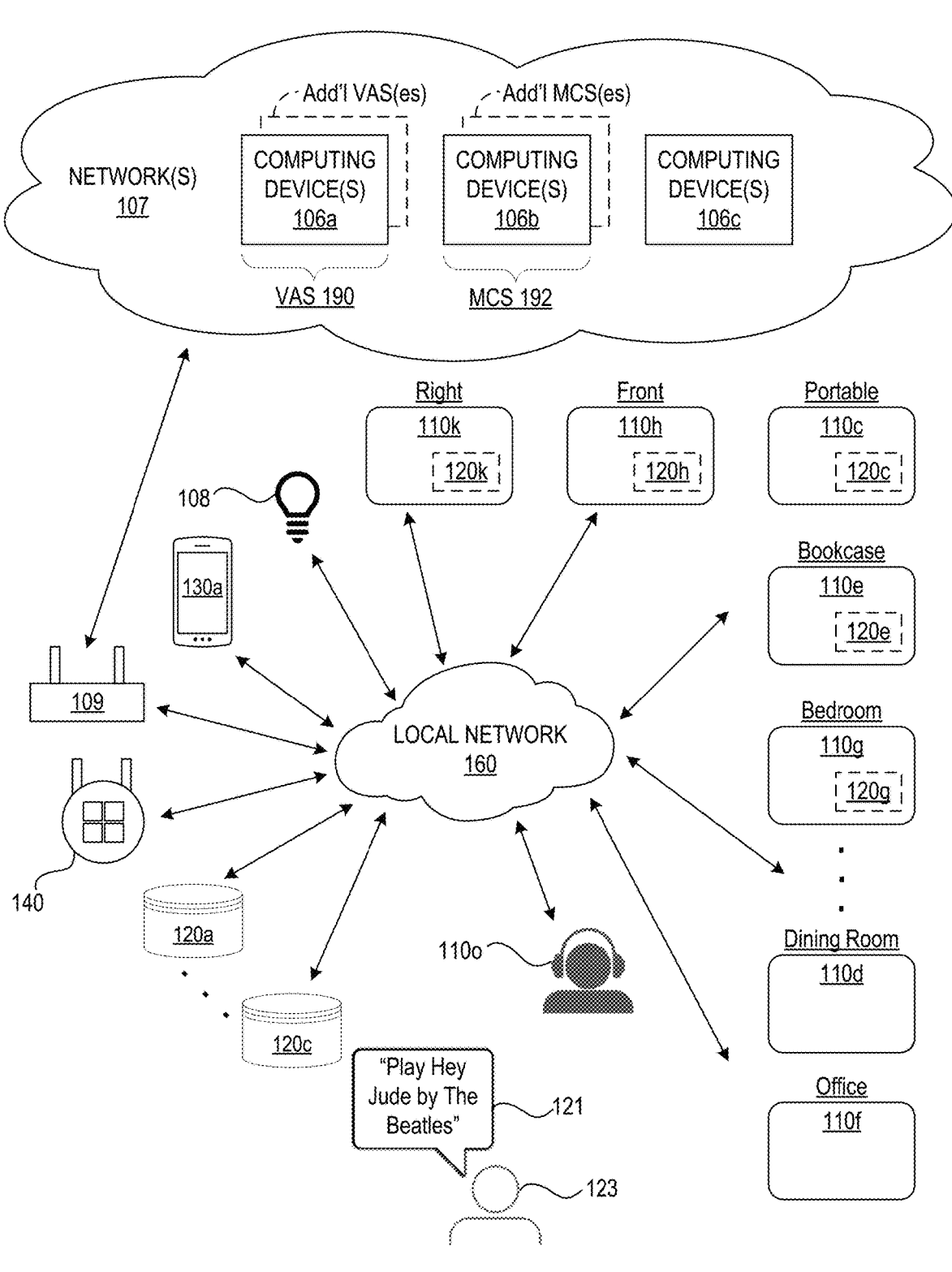
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101a, a Master Bedroom 101b, a Second Bedroom 101c, a Family Room or Den 101d, an Office 101e, a Living Room 101f, a Dining Room 101g, a Kitchen 101h, and an outdoor Patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101e, Master Bathroom 101a, Master Bedroom 101b, the Second Bedroom 101c, Kitchen 101h, Dining Room 101g, Living Room 101f, and/or the Patio 101i. In some aspects, a single playback zone may include multiple rooms or spaces. In certain aspects, a single room or space may include multiple playback zones.

In the illustrated embodiment of FIG. 1A, the Master Bathroom 101a, the Second Bedroom 101c, the Office 101e, the Living Room 101f, the Dining Room 101g, the Kitchen 101h, and the outdoor Patio 101i each include one playback device 110, and the Master Bedroom 101b and the Den 101d include a plurality of playback devices 110. In the Master Bedroom 101b, the playback devices 110l and 110m may be configured, for example, to play back audio content in synchrony as individual ones of playback devices 110, as a bonded playback zone, as a consolidated playback device, and/or any combination thereof. Similarly, in the Den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 1100 (FIG. 1B) are a portable playback device, while the playback device 110e on the bookcase may be a stationary device. As another example, the playback device 110c on the Patio 101i may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY®, PANDORA®, AMAZON MUSIC®, YOUTUBE MUSIC, APPLE MUSIC®, GOOGLE PLAY®, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device(s) 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio 101i may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/ or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Pat. No. 10,499,146, issued Nov. 13, 2019 and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B), amplify the received audio, and output the amplified audio for playback via one or more of the transducers 114. In some embodiments, the playback device 110*a* optionally includes one or more microphones (e.g., a single microphone, a plurality of microphones, a microphone array) (hereinafter referred to as "the microphones"). In certain embodiments, for example, the playback device 110*a* having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g*, one or more audio amplifiers 112*h* (referred to hereinafter as "the amplifiers 112*h*"), power components 112*i* (e.g., one or more power supplies, power cables, power receptacles, batteries, induction coils, Power-over Ethernet (POE) interfaces, and/or other suitable sources of electric power), and one or more orientation sensors 112*j* (e.g., an accelerometer, gyroscope, inertial measurement unit, etc.).

In some embodiments, the electronics 112 optionally include one or more other components 112*k* (e.g., one or more other sensors, video displays, touchscreens, battery charging bases). In some embodiments, the playback device 110*a* and electronics 112 may further include one or more voice processing components that are operably coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., nontransitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

In some implementations, the power components 112i of the playback device 110a may additionally include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110a may include a speaker interface for connecting the playback device to external speakers. In other embodiments, the playback device 110a may include an audio interface for connecting the playback device to an external audio amplifier or audio-visual receiver.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," "SUB," "BEAM," "ARC," "MOVE," and "ROAM," among others. Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110*q* includes additional playback devices and/or another bonded playback device.

Figure 2:
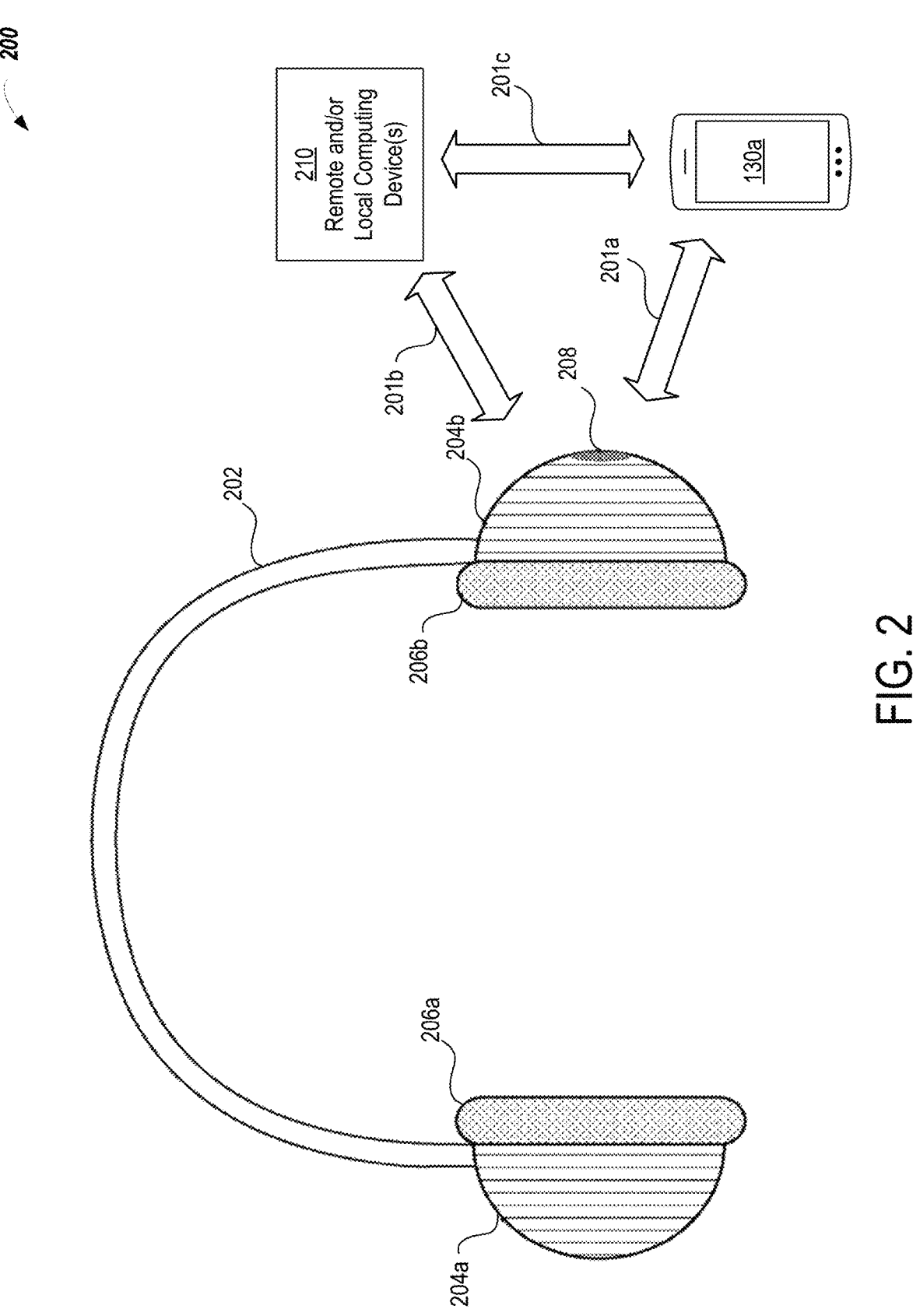
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, etc.). For instance, FIG. 2 shows an example headset assembly 200 ("headset 200") for such an implementation of one of the playback devices 110. As shown, the headset 200 includes a headband 202 that couples a first earcup 204*a* to a second earcup 204*b*. Each of the earcups 204*a* and 204*b* may house any portion of the electronic components in the playback device 110, such as one or more speakers. Further, one or both of the earcups 204*a* and 204*b* may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206*a* and 206*b* that are coupled to earcups 204*a* and 204*b*, respectively. The ear cushions 206*a* and 206*b* may provide a soft barrier between the head of a user and the earcups 204*a* and 204*b*, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201*a* (e.g., a BLUETOOTH link) with one of the control devices 130, such as the control device 130*a*, and/or over a second communication link 201*b* (e.g., a WIFI or cellular link) with one or more other computing devices 210 (e.g., a network router and/or a remote server). As another possibility, a playback device may communicate over multiple communication links, such as the first communication link 201*a* with the control device 130*a* and a third communication link 201*c* (e.g., a WIFI or cellular link) between the control device 130*a* and the one or more other computing devices 210. Thus, the control device 130*a* may function as an intermediary between the playback device and the one or more other computing devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

Figures 1F, 1G, 1H:
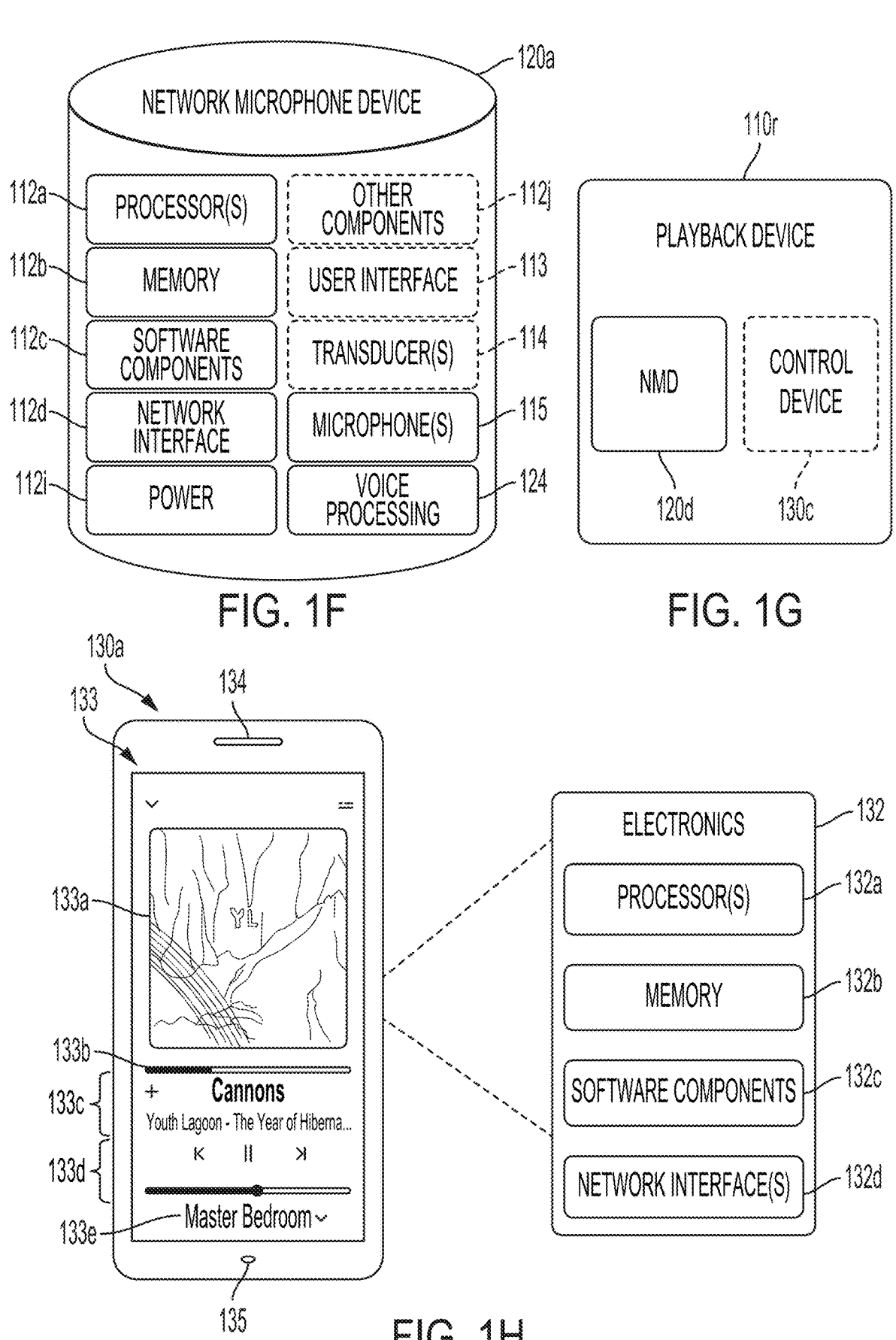
FIG. 1F is a block diagram of an example network microphone device.
FIG. 1G is a block diagram of an example playback device.
FIG. 1H is a partially schematic diagram of an example control device.

FIG. 1F is a block diagram of the NMD 120*a* (FIGS. 1A and 1B). The NMD 120*a* includes one or more voice processing components 124 and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1C. In some aspects, for example, the NMD 120*a* includes the processor 112*a* and the memory 112*b* (FIG. 1C), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise any or all of the components of the playback device 110*a* and further include the microphones 115 and voice processing components 124 (FIG. 1F). The microphones 115 are configured to detect sound (i.e., acoustic waves) in the environment of the playback device 110*r*, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The NMD 120*a* may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

FIG. 1H is a partially schematic diagram of one example of the control device 130*a* (FIGS. 1A and 1B). As used herein, the term "control device" can be used interchangeably with "controller," "controller device," or "control system." Among other features, the control device 130*a* is configured to receive user input related to the MPS 100 and, in response, cause one or more devices in the MPS 100 to perform an action(s) and/or an operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the MPS 100. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processor(s) 132*a*"), a memory 132*b*, software components 132*c*, and a network interface 132*d*. The processor(s) 132*a* can be configured to perform functions relevant to facilitating user access, control, and configuration of the MPS 100. The memory 132*b* can comprise data storage that can be loaded with one or more of the software components executable by the processors 132*a* to perform those functions. The software components 132*c* can comprise applications and/or other executable software configured to facilitate control of the MPS 100. The memory 132*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

Figure 1I:
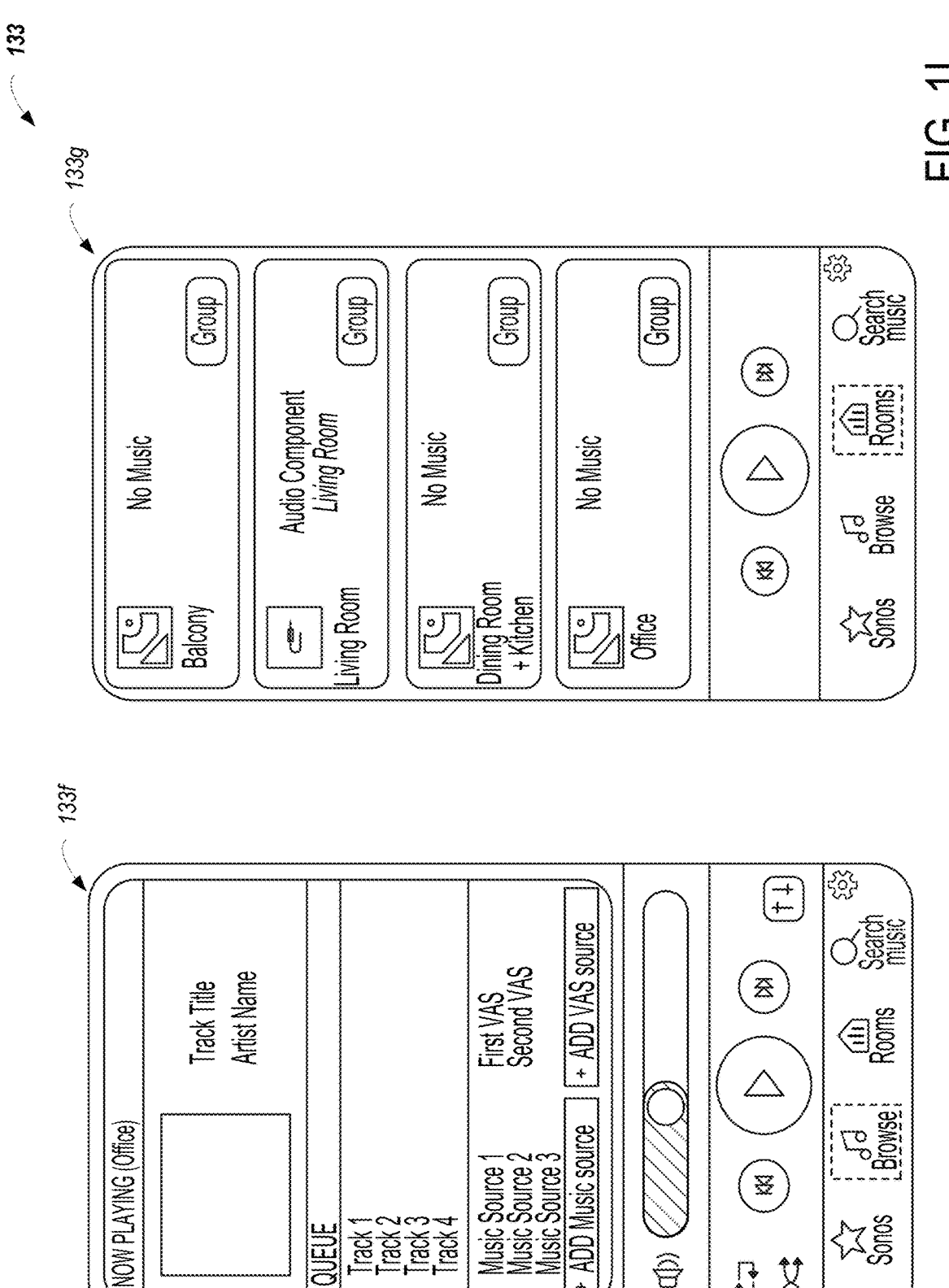
FIG. 1I is a schematic diagram of example user interfaces of the example control device of FIG. 1H.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1N:
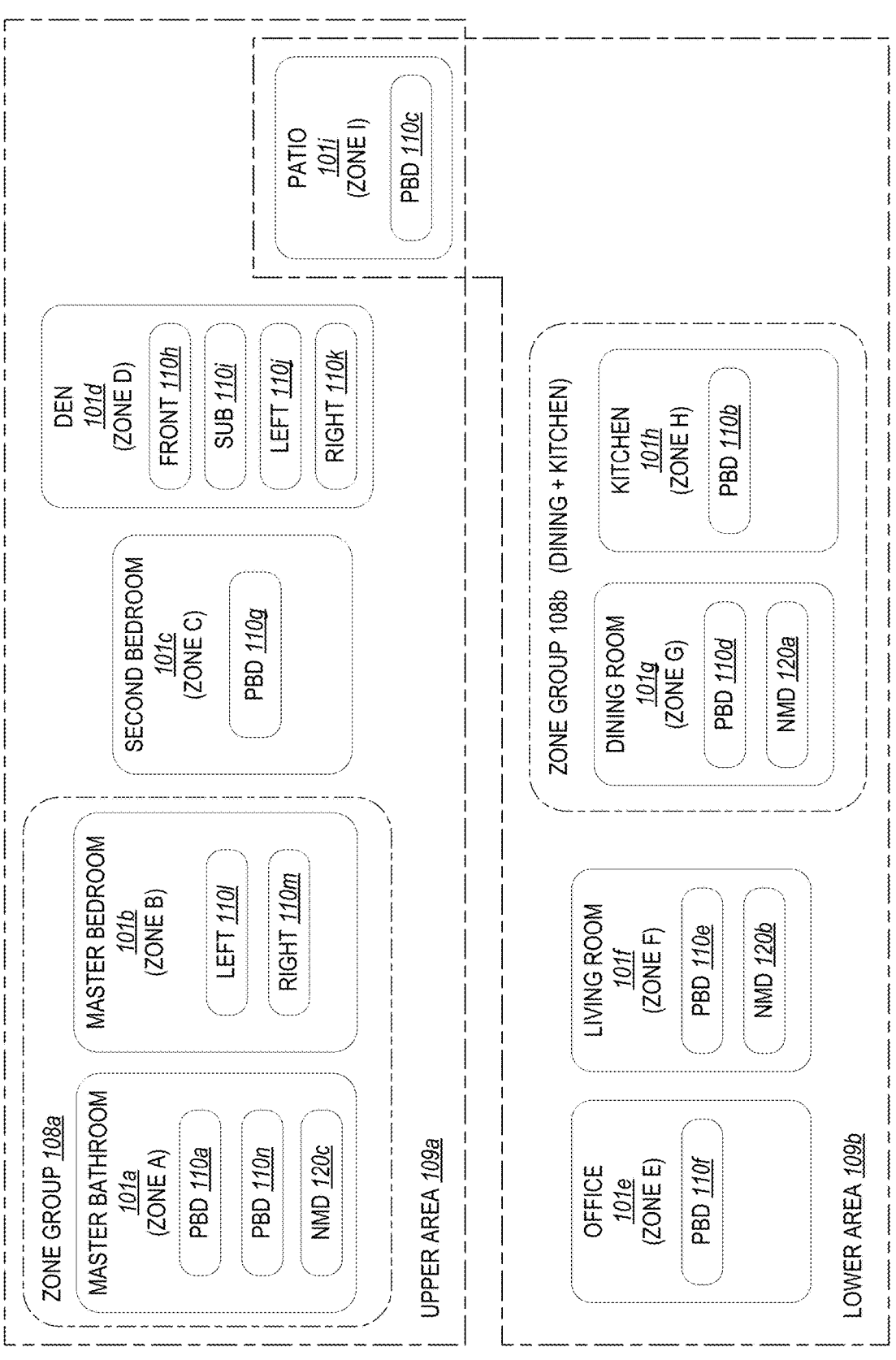
FIG. 1N is a schematic diagram of example media playback system areas.

FIGS. 1J, 1K, 1L, 1M, and 1N show example configurations of playback devices in zones and zone groups. Referring first to FIG. 1N, in one example, a single playback device may belong to a zone. For example, the playback device 110*g* in the Second Bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110*a* can be bonded to the playback device 110*n* and the NMD 120*c* to form Zone A. As another example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108*a*. As another example, the playback zones Zone G and Zone H can be merged to form Zone Group 108*b*. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB playback device 110*i* can be configured to render low frequencies. When unbonded, however, the Front device 110*h* can be configured to render a full range of frequencies. As another example, FIG. 1L shows the Front and SUB playback devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1N).

In other implementations, playback devices that are merged may not have assigned playback responsibilities and may each render the full range of audio content of which the respective playback device is capable. Nevertheless, merged devices may be represented as a single UI entity (i.e., a zone, as discussed above). For instance, the playback devices 110a and 110n in the Master Bathroom have the single UI entity of Zone A. In one embodiment, the playback devices 110a and 110n may each output the full range of audio content of which each respective playback devices 110a and 110n is capable, in synchrony.

In some embodiments, an NMD may be bonded or merged with one or more other devices so as to form a zone. As one example, the NMD 120c may be merged with the playback devices 110a and 110n to form Zone A. As another example, the NMD 120b may be bonded with the playback device 110e, which together form Zone F, named Living Room. In other embodiments, a stand-alone network micro-phone device may be in a zone by itself. In other embodi-ments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108a that includes the two zones, and Zone G may be grouped with Zone H to form the zone group 108b. How-ever, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchro-nously play back audio content.

In various implementations, the zone groups in an envi-ronment may be named by according to a name of a zone within the group or a combination of the names of the zones within a zone group. For example, Zone Group 108b can be assigned a name such as "Dining+Kitchen", as shown in FIG. 1N. In other implementations, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corre-sponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101c may indicate (i) that the playback device 110g is the only playback device of the Zone C and (ii) that Zone C is not in a zone group. Identifiers associated with the Den 101d may indicate that the Den 101d is not grouped with other zones but includes bonded playback devices 110h-110k. Identifiers associated with the Dining Room 101g may indicate that the Dining Room 101g is part of the Dining+Kitchen Zone Group 108b and that devices 110d and 110b (Kitchen 101h) are grouped (FIGS. 1M, 1N). Identifiers associated with the Kitchen 101h may indicate the same or similar information by virtue of the Kitchen 101h being part of the Dining+ Kitchen Zone Group 108b. Other example zone variables and identifiers are described below.

In yet another example, the MPS 100 may include vari-ables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712, 997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
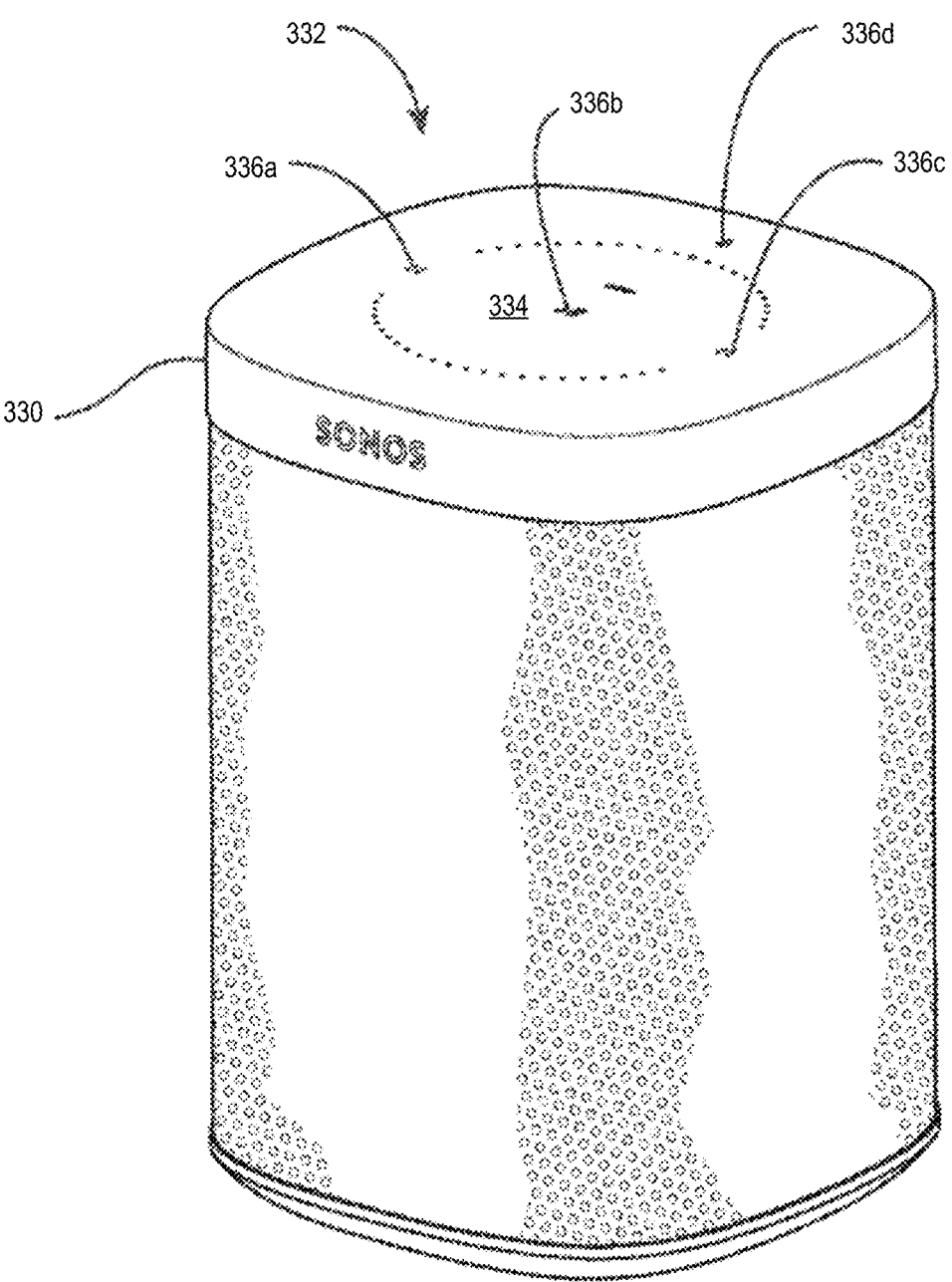
FIG. 3 is an isometric diagram of an example playback device housing.

FIG. 3 shows an example housing 330 of a playback device (e.g., one of the playback devices 110 discussed above) that includes a user interface in the form of a control area 332 at a top portion 334 of the housing 330. The control area 332 includes buttons 336a, 336b, and 336c for control-ling audio playback, volume level, and other functions. The control area 332 also includes a button 336d for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device. The microphones may be arranged in various positions along and/or within the top portion 334 or other areas of the housing 330 so as to detect sound from one or more directions relative to the playback device.

f. Audio Content

Audio content may be any type of audio content now known or later developed. For example, in some embodi-ments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

Audio content that can be played by a playback device as described herein, including any of the aforementioned types of audio content, may also be referred to herein as media content. A source from which the media content is obtained may be referred to herein as a media content source.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

III. Example Techniques for Detecting Invalid Playback Device Orientation

As mentioned above, a playback device may be configured to operate within a range of orientations, as measured about one or more rotational axes of the playback device, that may be considered valid orientations of the playback device. On the other hand, if the playback device is placed in an orientation that is outside a valid orientation range, it may be considered to be in an invalid orientation and the capabilities of the playback device may be limited, as discussed further below.

Figure 4C:
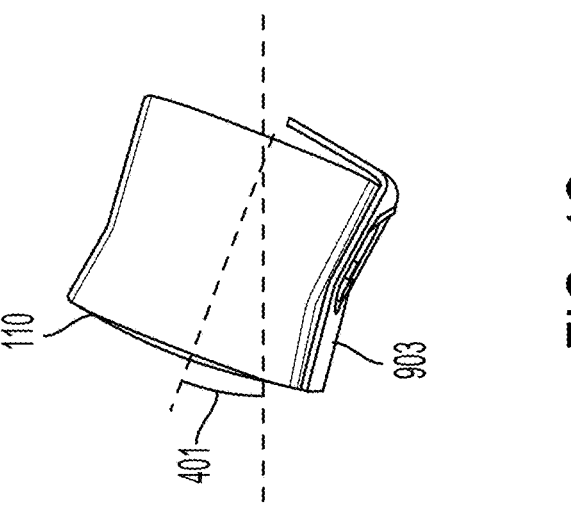
FIG. 4C is a side view of the example playback device of FIG. 5A oriented at a maximum downward rotation about the pitch axis of the playback device.
Figure 4B:
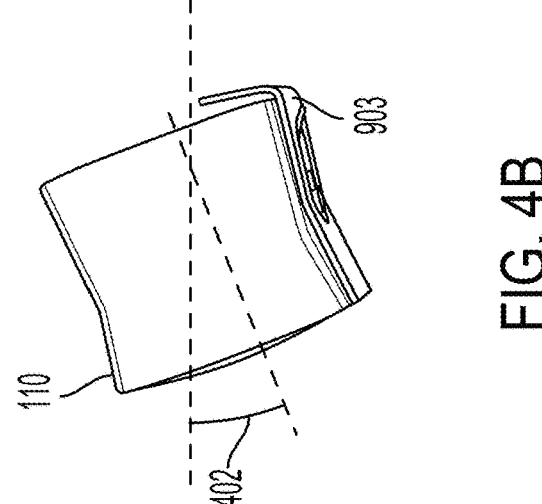
FIG. 4B is a side view of the example playback device of FIG. 5A oriented at a maximum upward rotation about the pitch axis of the playback device.
Figure 4A:
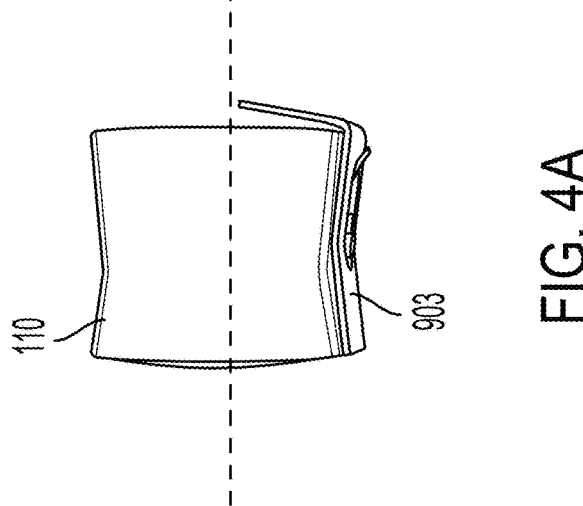
FIG. 4A is a side view of an example playback device oriented without rotation about a pitch axis of the playback device.

Turning to FIGS. 4A-4C, several side views of an example playback device 110 are shown which serve to illustrate possible rotations of the playback device about its pitch axis. In this regard, the playback device 110 may be, for example, any of the playback devices 110 discussed above and shown in FIGS. 1A-1N. Further, the playback device 110 shown in FIGS. 4A-4C can be optionally coupled to a platform 903 of an adjustable mounting assembly (discussed in further detail below with respect to FIGS. 9-15), which may be affixed to a wall or a stand, among other possibilities.

In FIG. 4A, the playback device 110 is shown in a neutral position—that is, without any rotation about its pitch axis. However, FIG. 4B shows the playback device 110 rotated downward about its pitch axis, as shown by the pitch rotation angle 402 (i.e., a positive pitch rotation). On the other hand, FIG. 4C shows the playback device 110 rotated upward about its pitch axis, as shown by the pitch rotation angle 401 (i.e., a negative pitch rotation). Such rotations may be desirable in various circumstances, depending on the location of the playback device 110 within the particular listening environment in which it is placed. For example, if the playback device 110 is mounted relatively high on a wall within a room, it may be desirable to rotate the playback device 110 downward about its pitch axis so that its primary transducers are directed toward the main listening area of the room.

The rotation angles shown in FIGS. 4B and 4C may represent the maximum rotations of the playback device 110 about its pitch axis. After this threshold rotation is reached, the playback device 110 may determine itself to be in an invalid orientation. For instance, in some examples, the threshold upward or downward rotation of the playback device 110 may be 22.5 degrees in either direction. Other threshold pitch rotation angles are also possible, depending on the specifications of the particular playback device 110.

In the examples shown in FIGS. 4A-4C, the attachment of the playback device 110 to the adjustable mounting assembly may constrain the rotation of the playback device 110 such that it remains within the valid orientation limits noted above. However, it will be appreciated that the playback device 110 might not be coupled to the adjustable mounting assembly shown in FIGS. 4A-4C in every situation, and that placement of the playback device 110 with a positive or negative rotation about its pitch axis, perhaps outside the valid orientation limits, might occur in other ways. Accordingly, the playback device 110 may be configured to detect such invalid rotations and respond accordingly, as discussed in further detail below.

Turning to FIGS. 5A-5F, several front views of the example playback device 110 are shown which serve to illustrate possible rotations of the playback device about its roll axis. For example, in FIG. 5A, the playback device 110 is shown in a neutral position—that is, without any rotation about its roll axis. However, FIG. 5B shows the playback device 110 rotated counterclockwise about its roll axis, as shown by the roll rotation angle 501 (i.e., a positive roll rotation). On the other hand, FIG. 5C shows the playback device 110 rotated clockwise about its roll axis, as shown by the roll rotation angle 502 (i.e., a negative roll rotation). As with the pitch rotations discussed above, such rotations about the playback device's roll axis may be desirable in various circumstances, depending on the location of the playback device 110 within the particular listening environment in which it is placed.

The rotation angles shown in FIGS. 5B and 5C may represent the maximum rotations of the playback device 110 about its roll axis. After this threshold roll rotation is reached—which may be a different value than the threshold pitch rotation—the playback device 110 may determine itself to be in an invalid orientation. For instance, in some examples, the threshold counterclockwise or clockwise roll rotation of the playback device 110 may be smaller than the threshold upward or downward pitch rotation of the playback device. In some examples, the threshold counterclockwise or clockwise rotation of the playback device 110 may be 15 degrees in either direction. Other threshold roll rotation angles are also possible, depending on the specifications of the particular playback device 110.

FIG. 5D shows another possible orientation of the playback device 110 about its roll axis—namely, an inverted orientation representing a 180 degree rotation from the neutral position shown in FIG. 5A. In some implementations, the inverted orientation shown in FIG. 5D may be treated as a valid orientation for the playback device 110, and may be desirable in some situations. For example, in scenarios where the playback device 110 does not include upward firing transducers, or if such functionality is not desired, the playback device 110 might be mounted in an inverted position so as to make its user interface (e.g., play/pause, volume controls, etc.) more easily accessible.

Nonetheless, rotations of the playback device 110 away from the inverted position shown in FIG. 5D might only be valid within a certain range. For instance, FIG. 5E shows the playback device 110 rotated counterclockwise from the inverted position, as shown by the roll rotation angle 503 (i.e., a positive roll rotation). Similarly, FIG. 5F shows the playback device 110 rotated clockwise from the inverted position, as shown by the roll rotation angle 504 (i.e., a negative roll rotation). Each of the rotations shown in FIGS. 5E and 5F may represent a rotation of 15 degrees from the inverted position, which may also be viewed as a +/−165 degree rotation from the neutral position shown in FIG. 5A. As above, these rotations may represent the threshold roll rotation that the playback device 110 may experience while still being considered to be in a valid orientation.

As with the pitch rotations discussed above, the attachment of the playback device 110 to the adjustable mounting assembly may constrain its roll rotations such that it remains within the valid orientation limits noted above. However, in situations where the adjustable mounting assembly is not used, the playback device 110 may be rotated beyond the threshold rotation limits in one or both of the pitch and roll directions, thereby placing it in an invalid orientation.

Accordingly, to detect and respond accordingly to being placed in an invalid orientation, the playback device 110 may include one or more orientation sensors, such as the one or more orientation sensors 112j shown in relation to the playback device 110a of FIG. 1C. In practice, the one or more orientation sensors may include, for example, a three-axis accelerometer that provides orientation data indicating the rotation(s) of the playback device 110 about both its pitch and roll axes. Additional discussion related to playback using positioning information of a playback device can be found in U.S. Pat. No. 8,995,240, which is incorporated by reference herein in its entirety. Further, additional information related to shaping sound responsive to the orientation of a playback device can be found in U.S. Pat. No. 9,042,556, which is incorporated by reference herein in its entirety.

Turning now to FIG. 6, a flowchart 600 is shown that illustrates one example implementation for detecting and handling a playback device that has been placed in an invalid orientation. The playback device discussed with respect to FIG. 6 may be, as in the examples above, the playback device 110. In addition, the at least one orientation sensor of the playback device 110 will be referred to as an accelerometer in the discussion that follows, however it should be understood that the at least one orientation sensor may take various other forms as well, including multiple accelerometers, one or more gyroscopes, one or more magnetometers, one or more inertial measurement units, or any combination thereof.

Beginning at block 602, the playback device 110 may obtain, via the accelerometer, orientation data for the playback device 110. In this regard, the playback device 110 may (e.g., via an orientation driver) continuously poll the accelerometer (or any associated data register) during operation to determine the current orientation of the playback device 110. For example, the accelerometer may gather orientation data at a frequency between 1 Hz and 200 Hz, such as 100 Hz. The orientation data can be stored in a buffer/storage, such as a 16-deep first-in-first-out (FIFO) data buffer, among other examples. The orientation driver may read data out of the storage at particular intervals of time, such as every 1 ms, 100 ms, 250 ms, 500 ms, etc. Other frequencies are also possible.

However, it may be possible that in some situations, the playback device 110 may be bumped, or that vibrations of the playback device 110 caused by the playback of audio content may result in perturbations to the instantaneous accelerometer readings, such that playback device 110 may appear to have changed its orientation when it did not. For this reason, the playback device 110 may determine a running average of the orientation values that are obtained from the accelerometer and thereby decrease the likelihood that an instantaneous reading from the accelerometer might result in a false positive determination that the playback device 110 has been placed at an invalid orientation.

The playback device 110 may determine a running average of the orientation values that are obtained from the accelerometer in various ways. As one possibility, the playback device 110 may maintain a buffer that includes a running set of the most recently received orientation data readings from the accelerometer and determine average orientation values for the buffer. For example, the playback device 110 may maintain a FIFO buffer of the 16 most recently received orientation data readings, as noted above. Further, the playback device 110 may determine, for the running set of orientation data in the buffer, an average rotation of the playback device about its pitch axis and an average rotation of the playback device about its roll axis. As each new reading from the accelerometer is received, the playback device 110 may add the newest reading and remove the oldest reading from the buffer, and then recalculate the averages. Accordingly, when the playback device 110 determines whether its pitch or roll rotation exceeds the respective threshold rotations (e.g., at block 604 discussed below), it may base this determination on the running averages that it calculates.

Other examples for how the playback device 110 may determine a running average for the orientation data from the accelerometer are also possible.

In some other implementations, the playback device 110 might not continuously poll the accelerometer for orientation data. For instance, in a situation where sound quality is the only orientation-based consideration and there is no risk of orientation-based thermal events, the playback device 110 might not poll the accelerometer for orientation data until a request to configure the playback device 110 is received. In this context, a request to configure the playback device 110 may be received from the control device, such as the control device 130, and my correspond to a command to add the playback device 110 to a bonded playback zone (e.g., a stereo pair), a command to perform an audio calibration, or a request to set up the playback device 110 to perform some other functionality (e.g., a request to enable a voice assistant, etc.).

The playback device 110 may obtain orientation data from the accelerometer in other manners and at other times as well.

At block 604, based on the obtained orientation data, the playback device 110 may determine that a rotation of the playback device 110 about its roll axis exceeds the threshold roll rotation. Additionally, or alternatively, the playback device 110 may determine that a rotation of the playback device 110 about its pitch axis exceeds the threshold pitch rotation. As noted above, the playback device 110 may base these determinations on the average rotations determined for the running set of most recently obtained orientation data from the accelerometer.

If either threshold rotation is exceeded, or if both are exceeded, the playback device 110 may determine that it is positioned in an invalid orientation.

At block 606, based on determining that the rotation of the playback device 110 exceeds at least one of the threshold roll rotation or the threshold pitch rotation, the playback device 110 may take various actions. As one possibility, the playback device 110 may transition from operating in a valid orientation mode in which the playback device 110 is allowed to play back audio content to operating in an invalid orientation mode in which the playback device 110 has limited playback capabilities for playing back audio content. For example, the playback device 110 may reduce and or cap the volume of the playback device 110 to a certain level, such as 15%. In other examples, the playback device 110 may treat the invalid orientation mode as a fault condition such that it is restricted from playing back any audio content until the invalid orientation is resolved.

As another possibility, the playback device 110 may update a state variable that indicates the invalid orientation and/or the invalid orientation mode of the playback device 110. In some implementations, the playback device 110 may transmit an indication of this updated state variable to one or more other devices of a media playback system that includes the playback device 110 (e.g., the media playback system 101) upon updating the state variable. In other examples, the playback device 110 may update the state variable and store it in memory, and then other devices of the media playback system 101 may request the value of the state variable as necessary.

As yet another possibility, the playback device 110 may provide visual feedback by causing a visual interface of the playback device 110 to display an indication of the invalid orientation mode. For instance, the visual interface of the playback device 110 may include an LED light, which may be illuminated in a particular color (e.g., amber, red, etc.) that indicates the invalid orientation condition. Other visual interfaces are also possible, including a display screen.

Further, the playback device 110 might also provide audio feedback, in the form of an audio tone or the like, which may serve as a cue to the user that playback device 110 transitioned from the valid orientation mode to the invalid orientation mode. Other examples are also possible.

As yet another possibility, at block 608, the playback device 110 may optionally cause a notification indicating the invalid orientation mode to be displayed at a computing device that is communicatively coupled to the playback device. For example, the playback device 110 may transmit an indication of the invalid orientation mode to the control device 130, causing the control device 130 to display, via a media playback system controller application running on the control device 130, a corresponding notification. The notification displayed by the control device 130 may take various forms, some examples of which are shown in FIGS. 7A-7B and FIG. 8.

Figures 7A, 7B:
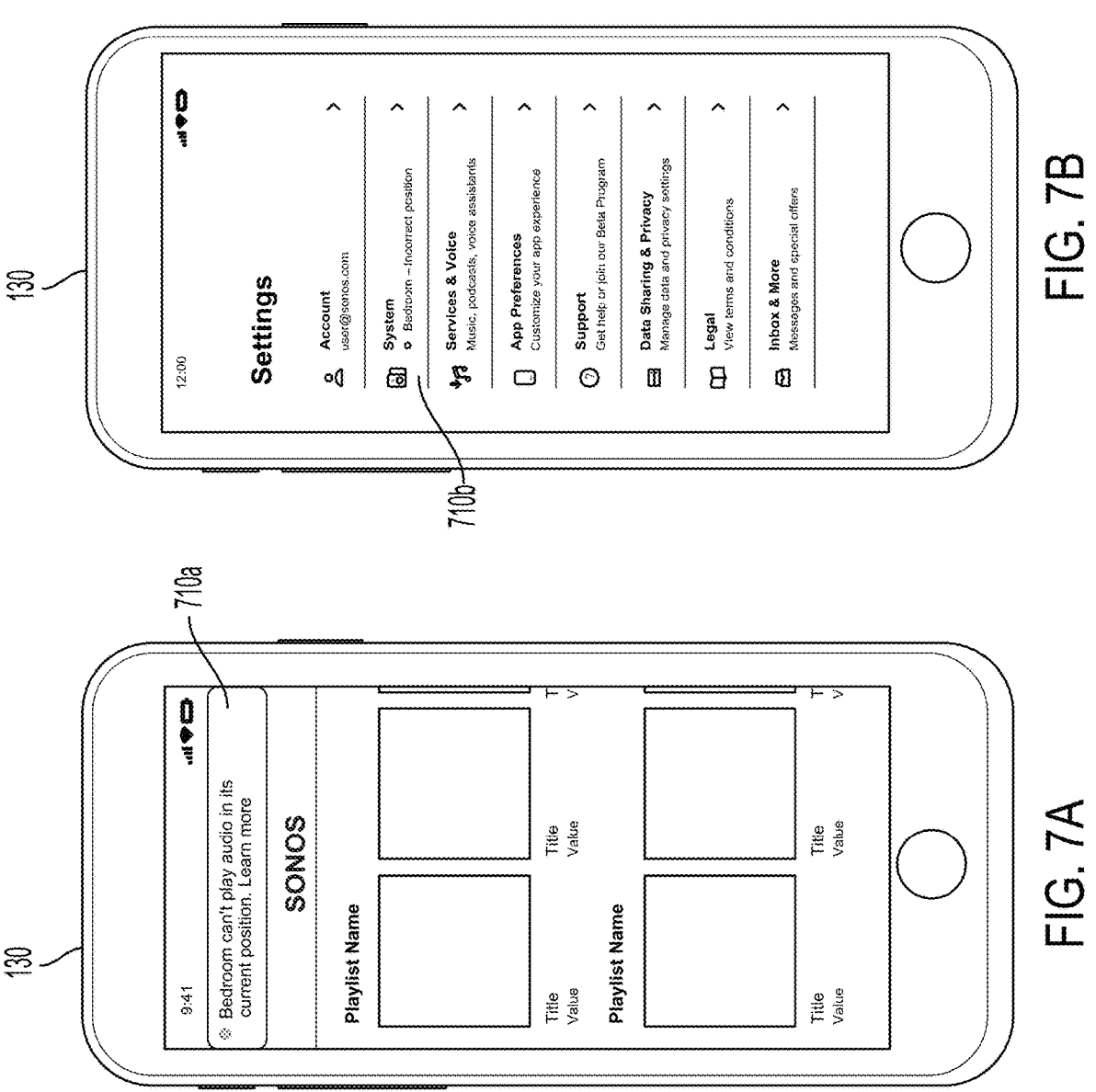
FIG. 7A is a schematic diagram of an invalid orientation notification presented via a user interface of a control device.
FIG. 7B is a schematic diagram of another invalid orientation notification presented via a user interface of a control device.

In the example shown in FIG. 7A, a control device 130 displays a banner notification 710a, which may remain always-on-top and persist across numerous screens of the media playback system controller application. The banner notification 710a includes a red notification dot, along with a textual description explaining that the playback device 110—designated as a Bedroom playback device in this example—cannot play audio in its current position. Selecting the banner notification may cause the control device 130 to display instructions for resolving the invalid orientation, as shown in FIG. 8 and discussed below.

Another type of notification in shown in FIG. 7B, where the notification 710b indicating the invalid orientation mode is presented in a settings menu, rather than the banner notification shown in FIG. 7A. In other examples, the notification may be displayed only within particular screens of the media playback system controller application that pertain to the playback device 110.

Figure 8:
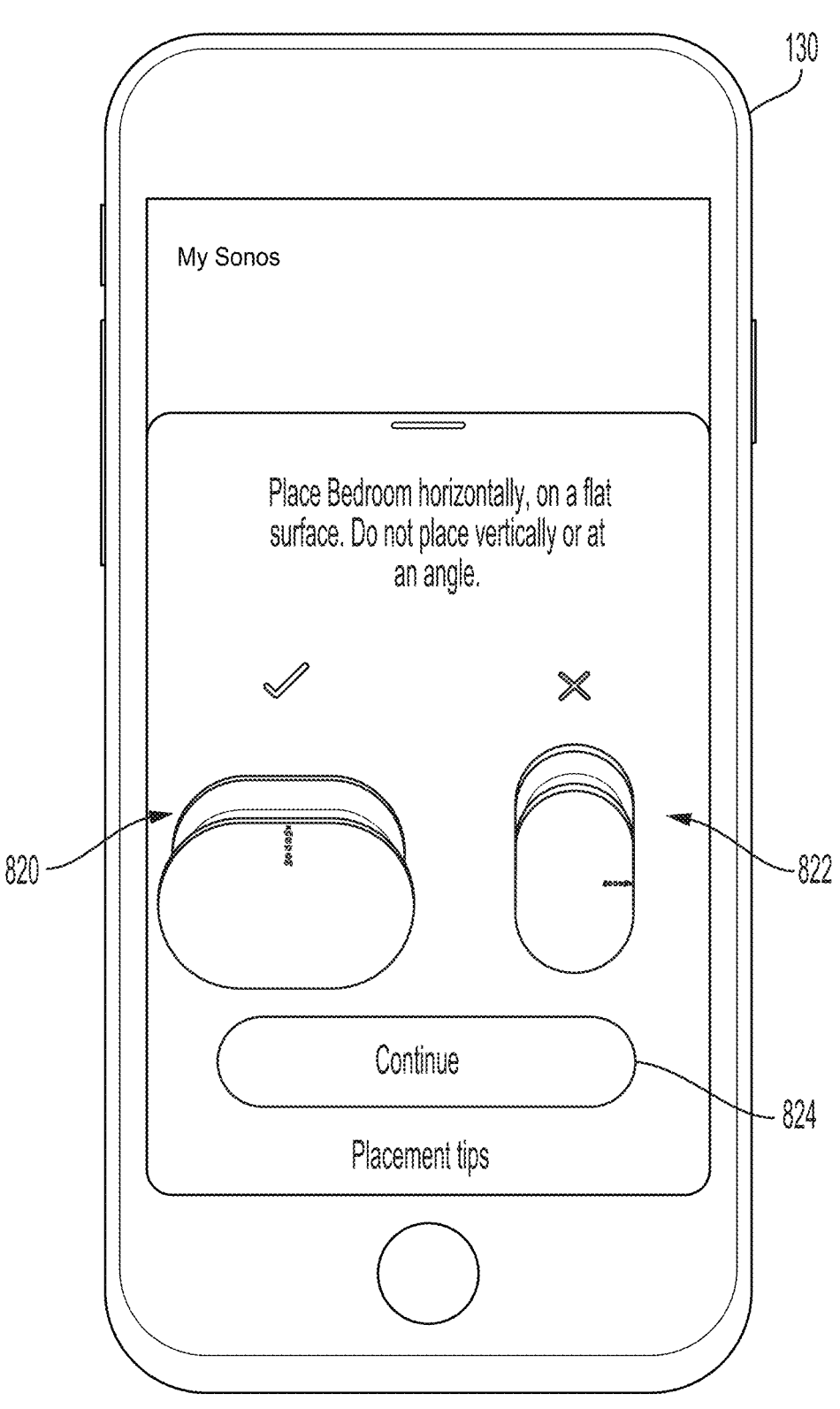
FIG. 8 is a schematic diagram of an instruction for orienting a playback device presented via a user interface of a control device.

FIG. 8 illustrates another type of notification that may be displayed by the control device 130 that provides an instruction for how to resolve the invalid orientation, along with visual representation 820 that shows the playback device 110 in valid orientation, as well as a representation 822 that shows the playback device 110 in an invalid orientation. For example, a user may be presented with the notification shown in FIG. 8 upon a selection of either of the notifications shown in FIG. 7A or 7B, or any other similar notification.

As another possibility, as suggested above, the notification shown in FIG. 8 may be presented via the control device 130 if a user provides an input via the control device 130 indicating a request to configure the playback device 110 (e.g., by setting up a bonded zone with another playback device, by calibrating the playback device 110, etc.), but the control device 130 determines that the playback device 110 is in an invalid orientation. After being presented with the notification seen in FIG. 8 and resolving the invalid orientation condition, a user may select the selectable icon 824 to "Continue" which may dismiss the notification. As yet another possibility, the notification shown in FIG. 8 may be presented to a user when the playback device 110 is initially set up, such that a user may become familiar with the valid and invalid orientations of the playback device 110. Numerous other possibilities also exist.

In situations where the playback device 110 is in an invalid orientation mode, returning the playback device 110 to the valid orientation mode may cause both the playback device 110 and the control device 130 to clear any notifications related to the invalid orientation. For example, based on orientation data received from the accelerometer, the playback device 110 may determine that neither the threshold roll rotation of the playback device 110 nor the threshold pitch rotation of the playback device 110 is currently exceeded. Accordingly, based on making this determination, the playback device 110 may transition from operating in the invalid orientation mode to operating in the valid orientation mode. This may involve, for example, updating the state variable to indicate the valid orientation mode, clearing any visual indications that the playback device 110 was presenting, and removing any restrictions with respect to the playback of audio content. Further, the playback device 110 may cause the computing device 130 to clear any notifications indicating the invalid orientation mode. For example, the playback device 110 may transmit an indication of the updated state variable to the control device 130, among other possibilities.

In some implementations, with reference to block 604 above, the playback device 110 may determine, based on the orientation data obtained via the one or more orientation sensors, that the playback device 110 is in an inverted orientation. Although this may be considered a valid orientation, as noted above, it may nonetheless be desirable to adjust various settings of the playback device 110 when it is in an inverted orientation. In these situations, with reference to block 606 above, the playback device 110 may transition from operating in a valid orientation mode to operating in a valid-inverted orientation mode, where certain playback settings may be adjusted.

The adjustments that may be implemented in an inverted orientation may take various forms. As one possibility, the playback device 110 may adjust its equalization and/or audio calibration settings to reflect that the relative directions for audio output (e.g., right and left, up and down) have been reversed as a result of its inverted orientation, and/or that the playback device 110 is likely to be in an elevated position (e.g., above a listener's head) within the listening environment if it has been positioned in an inverted orientation. For instance, if the playback device 110 is configured for stereo playback of audio content, the playback may output right channel audio via its transducers that would normally output left channel audio, and vice versa.

Similarly, if the playback device 110 includes one or more upward-firing transducers that are configured to play back vertical audio channels in a spatial audio arrangement—but that are now facing downward as a result of the inverted orientation, the playback device 110 may adjust the audio output from the one or more upward-firing transducers. For example, the playback device 110 may adjust its audio settings such that the upward-firing transducers do not output vertical audio channels, and/or output selected audio channels in a downward direction (e.g., center channel audio content) as a way to de-elevate the audio image produced by the playback device 110. Alternatively, the playback device 110 may disable the upward-firing transducers in the valid-inverted orientation mode. Other examples are also possible.

As another possibility, the playback device 110 may reverse certain control aspects of a user interface on the playback device 110 when operating in the valid-inverted mode. For example, a volume control bar on the playback device 110 that normally operates to raise the volume level of the playback device 110 with a left-to-right swipe interaction, from the user's perspective, may be reversed. In this way, the volume control bar may operate in the same way, from the user's perspective, when inverted. Namely, a left-to-right swipe will raise the volume level, even though this interaction is in the opposite direction from the perspective of the playback device 110. In a similar way, transport controls located on the playback device 110 (e.g., skip forward, skip backward) may also be reversed, such that skipping forward corresponds to a button or interaction on the right side of the playback device, from the user's perspective, and moving backward corresponds to a button or interaction on the left side of the playback device 110, from the user's perspective.

Still further, and with reference to block 608, one or more notifications may be presented via a control device indicating the adjustments noted above. For example, a notification may be displayed via the control device indicating that spatial audio content cannot be played back by the playback device 110 when it is in the inverted orientation. As another example, a notification may be displayed via the control device indicating that on-device controls for volume, skip forward/back, etc. have been reversed to provide a consistent user-experience. Numerous other examples are also possible.

In some implementations, other alterative orientations may be treated as valid orientations for the playback device 110. For example, the playback device may be rotated 90 degrees so that it can be used in any of a vertical or horizontal orientation. The inverted valid orientation shown in FIG. 5D can be an example of such alternative valid orientations. Similarly to what was described for the inverted orientation shown in FIG. 5D, rotations of the playback device 110 away from these alternative valid positions might only be valid within a certain range. The playback device 110 may determine, based on the orientation data obtained via the one or more orientation sensors, that the playback device 110 is in an alternative valid orientation. As noted above for the inverted orientation, in these instances it may be desirable to adjust various settings when the playback device is in an alternative valid orientation.

FIG. 6 includes one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIG. 6 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 6 may represent circuitry and/or machinery that is wired or arranged to perform the specific functions in the process.

IV. Example Adjustable Mounting Assembly

As noted above, additional embodiments described herein involve configurations of an adjustable mounting assembly that may be adapted for use with a playback device. For example, an adjustable mounting assembly may include mechanical limits that prevent adjustment of a mounted playback device beyond certain limits, in additional to other beneficial aspects as discussed below. Additional details regarding example adjustable mounting assemblies can be found in U.S. application Ser. No. 63/412,039, the disclosure of which is attached as Appendix A.

Figure 9:
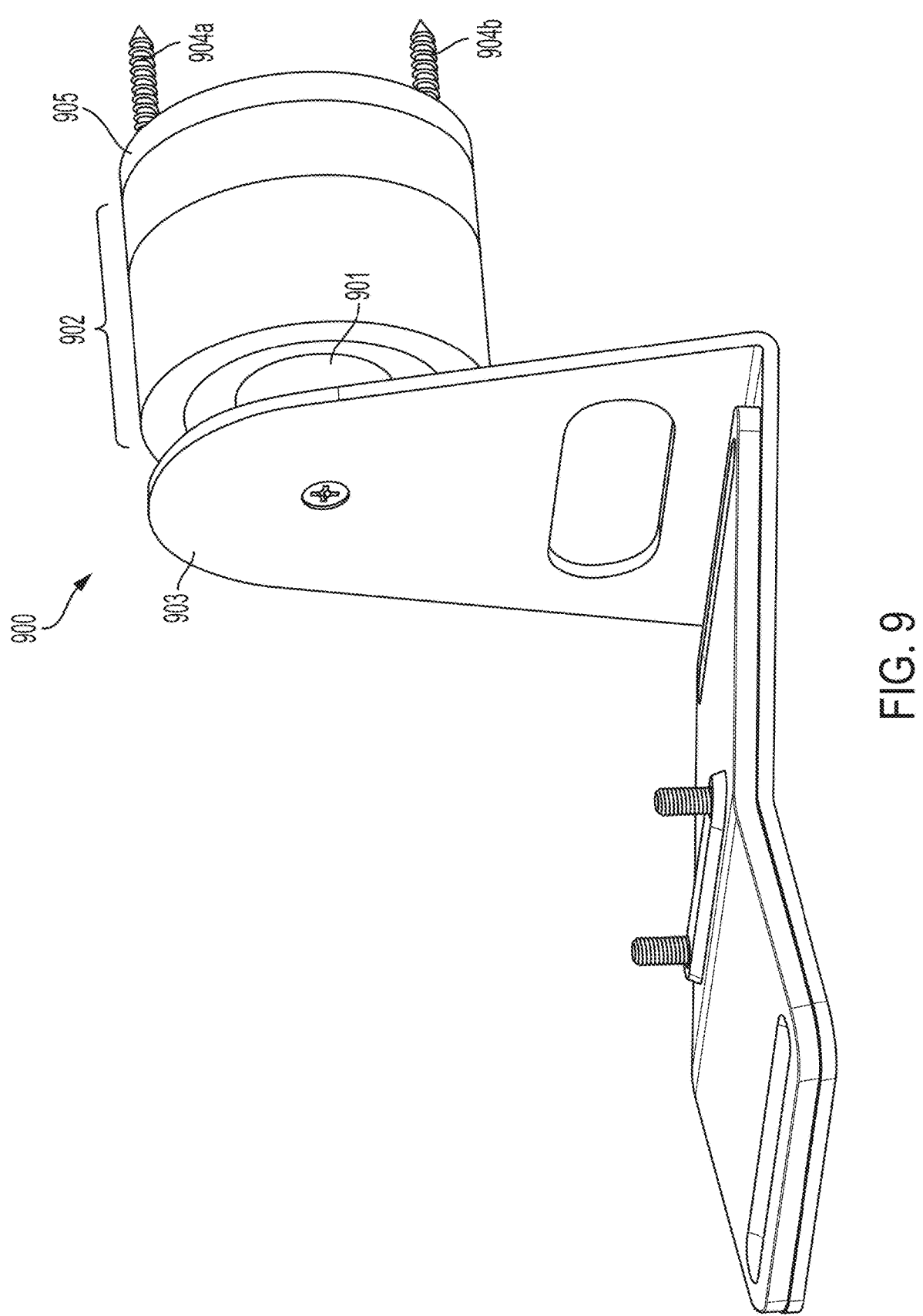
FIG. 9 shows a perspective view of an adjustable mounting assembly, according to an example implementation.

Turning to FIG. 9, a perspective view of an adjustable mounting assembly 900 is shown. The adjustable mounting assembly 900 includes a housing 902 that is divided into front and rear portions. Extending through an opening in the front of the housing is a front body part 901, which may be seen more clearly in subsequent figures. A platform 903 for receiving an audio playback device is attached to a stem of the front body part 901 and serves as a mounting interface for the object that it to be mounted.

In this regard, the platform 903 shown in FIG. 9 represents just one of many possible mounting interfaces that might be included as part of the adjustable mounting assembly 900. Moreover, although the examples discussed herein generally refer to the mounting of playback devices, it will be appreciated that the adjustable mounting assembly 900 may be used for mounting various different objects. For instance, the platform 903 might have a different shape than shown in FIG. 9 in order to conform to a particular playback device or other object. Further, the platform 903 might be replaced in some implementations by a bracket or other type of fastener that may be used to couple the object to be mounted to the adjustable mounting assembly 900. Other examples are also possible.

The adjustable mounting assembly 900 shown in FIG. 9 also includes a mounting bracket 905 removably coupled to the rear exterior side of the housing 902. A pair of fasteners extends through openings in the mounting bracket 905, shown in FIG. 9 as a first screw 904a and a second screw 904b, although various other fasteners may also be used.

Figure 10A:
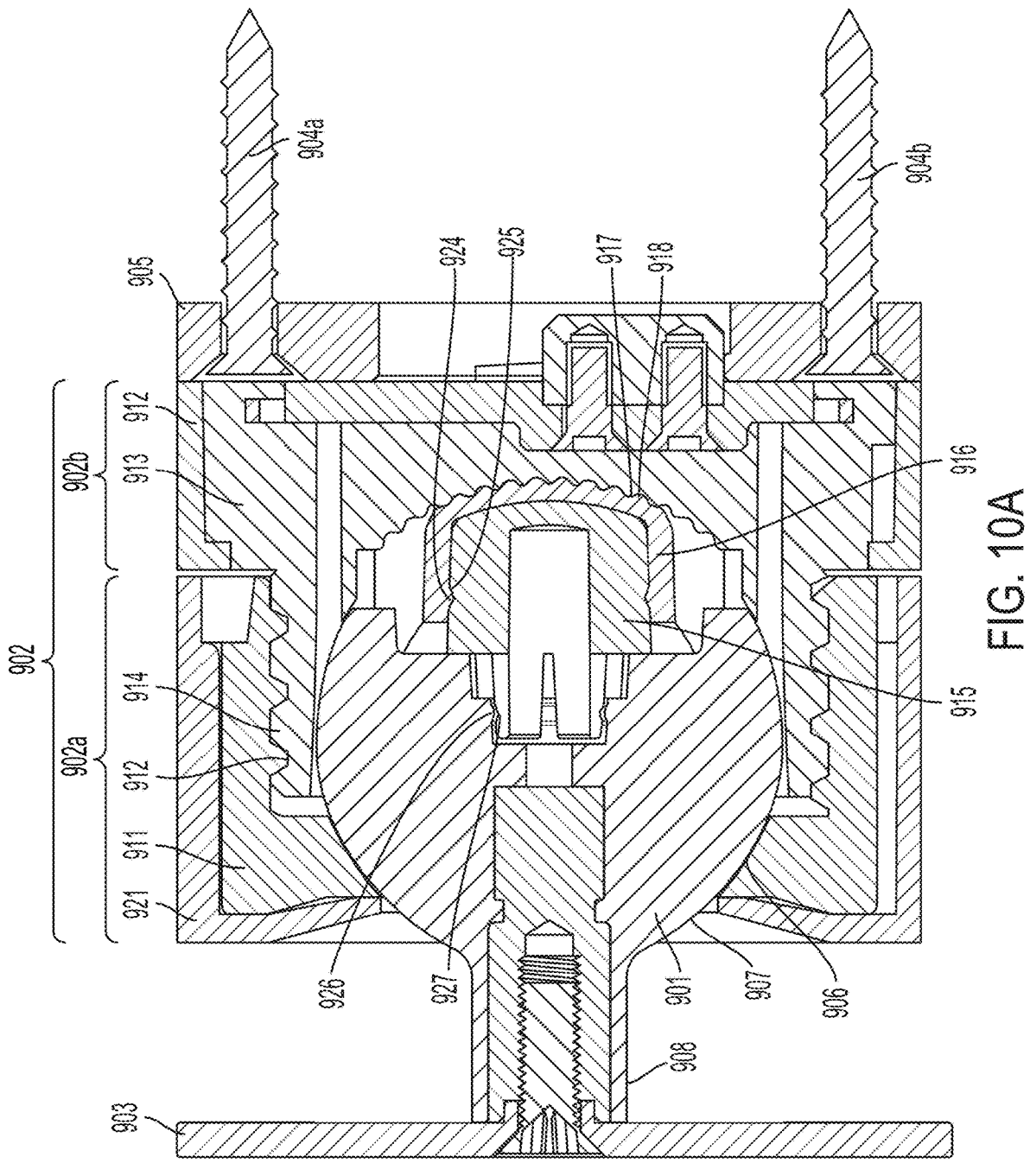
FIG. 10A shows a cross-sectional view of an adjustable mounting assembly in a first position, according to an example embodiment.

Referring now to FIG. 10A, a cross-sectional view of the adjustable mounting assembly 900, focusing on the components internal to the housing 902 and omitting most of the platform 903.

As can be seen in FIG. 10A, the housing 902 may be divided into two parts—a front housing portion 902a and a rear housing portion 902b. The front housing portion 902a includes a front collar 911 and a front cover 921 surrounding the front collar 911. Both the front collar 911 and the front cover 921 include an opening (i.e., on the left side of the front housing portion 902a in FIG. 10A) about a roll axis of the adjustable mounting assembly 900.

Extending through the opening of the front collar 911 and the front cover 921 is the front body part 901. As shown in FIG. 10A, the front body part includes a spherical front face 907 that is shaped to abut and interior bearing surface 906 of the front collar 911 that surrounds the opening, which serves to hold the front body part 901 in place in conjunction with further components that will be discussed below. The front body part also includes a neck or stem 908 that extends radially outward from the spherical front face 907 at the opening and serves to link the front body part 901 with the platform 903. For instance, in the example of FIG. 10A the platform 903 is fastened to the stem 908 portion of the front body part 901 with a screw, although numerous other arrangements are also possible.

The rear housing portion 902b includes a rear cover 922 surrounding a rear collar 913, which is joined with the front collar 911 via a threaded engagement. For instance, the rear collar 913 may include one or more threads, such as the thread 914, that is engaged with one or more threads of the front collar 911, such as the thread 912. As will be discussed in further detail below, this may allow the front collar 911 and thus the entire front housing portion 902a to be translated either toward (i.e., tightening) or away from (i.e., loosening) the rear collar 913 and thus the entire rear housing portion 902b. In addition, the rear collar 913 may include a set of teeth 917 that are oriented toward the front collar 911, whose interaction will be discussed further in the following examples.

Within the housing 902, the front body part 901 may be coupled to an intermediate body part 915. The coupling between the front body part 901 and the intermediate body part 915 may be accomplished in various ways. As one possibility, the parts may be rotatably coupled about a roll axis of the adjustable mounting assembly 900. For instance, as shown in the example of FIG. 10A, the front body part 901 includes a rib 926 that is sized to engage a first groove 927 on a barrel-shaped portion of the intermediate body part 915. In this configuration, the rib 926 of the front body part 901 is slidable within the first groove 927 of the intermediate body part 915 when the front body part 901 is rotated about the roll axis of the adjustable mounting assembly 900. However, in this arrangement, relative rotations between these two parts about both the pitch axis and the yaw axis of the adjustable mounting assembly 900 may be prevented. For additional clarity, the rib 926 and the first groove 927 may also be seen from an alternate angle in the perspective views shown in FIG. 12 and FIG. 13.

The adjustable mounting assembly 900 may additionally include a rear body part 916 that is coupled to the intermediate body part 915. As above, the coupling between the rear body part 916 and the intermediate body part 915 may be accomplished in various ways. As one possibility, the parts may be rotatably coupled about a yaw axis of the adjustable mounting assembly 900. For instance, as shown in the example of FIG. 10A, the rear body part 916 includes a rib 924 that is sized to engage a second groove 925 of the intermediate body part 915. In this configuration, the rib 924 of the rear body part 916 is slidable within the second groove 925 of the intermediate body part 915 when the intermediate body part 915 is rotated about the yaw axis of the adjustable mounting assembly 900. However, in this arrangement, relative rotations between these two parts about both the pitch axis and the roll axis of the adjustable mounting assembly 900 may be prevented. For additional clarity, the second groove 925 may also be seen from an alternate angle in the perspective views shown in FIG. 11 and FIG. 12 (although the rib 924 of the rear body part 916 is not shown).

In addition, the rear body part 916 includes a set of teeth 918 that are oriented toward the rear collar 913. As shown in FIG. 10A, the teeth 918 of the rear body part 916 may engage the opposing teeth of the rear collar 913. As will be appreciated by examining FIG. 10A, the interlocking engagement of these teeth may prevent any rotation of the rear body part 916 about the pitch axis (i.e., up and down) of the adjustable mounting assembly 900. Further, this fixation of the rear body part 916 about the pitch axis may extend to the intermediate body part 915 and the front body part 901, which are all fixed with respect to each other about the pitch axis. By further extension, the stem 908 and the platform 903 may also be fixed about the pitch axis of the adjustable mounting assembly 900.

In this way, the adjustable mounting assembly 900 may be capable of supporting a relatively heavy object on the platform 903, whose weight is applied as a downward force that will cause a downward rotation about the pitch axis if not adequately resisted. In the configuration shown in FIG. 10A, this resistance does not need to be provided by frictional contact of the front, intermediate, and rear body parts with the interior of the housing 902, but is instead provided by the mechanical interlock of the teeth with the rear collar 913.

The mounting bracket 905 can also be seen in FIG. 10A, removably coupled to an exterior side of the rear collar 913. The mounting bracket 905 includes a pair of openings to receive respective fasteners for attaching the mounting bracket 905 to a mounting surface, such as a wall. In FIG. 10A, the fasteners are again shown as two screws 904a and 904b, although a different type and/or number of fasteners is also possible, depending on the application.

Although the example shown in FIG. 10A provides a solution to the issue of a supporting a relatively heavy object, the fixation about the pitch axis consequently limits the adjustability of the adjustable mounting assembly 900 about the pitch axis. For this reason, the adjustable mounting assembly 900 may be configured such that the interlocking teeth may be temporarily disengaged in order to provide adjustability, before they are reengaged to fix the adjustable mounting assembly 900 in a new orientation.

Figure 10B:
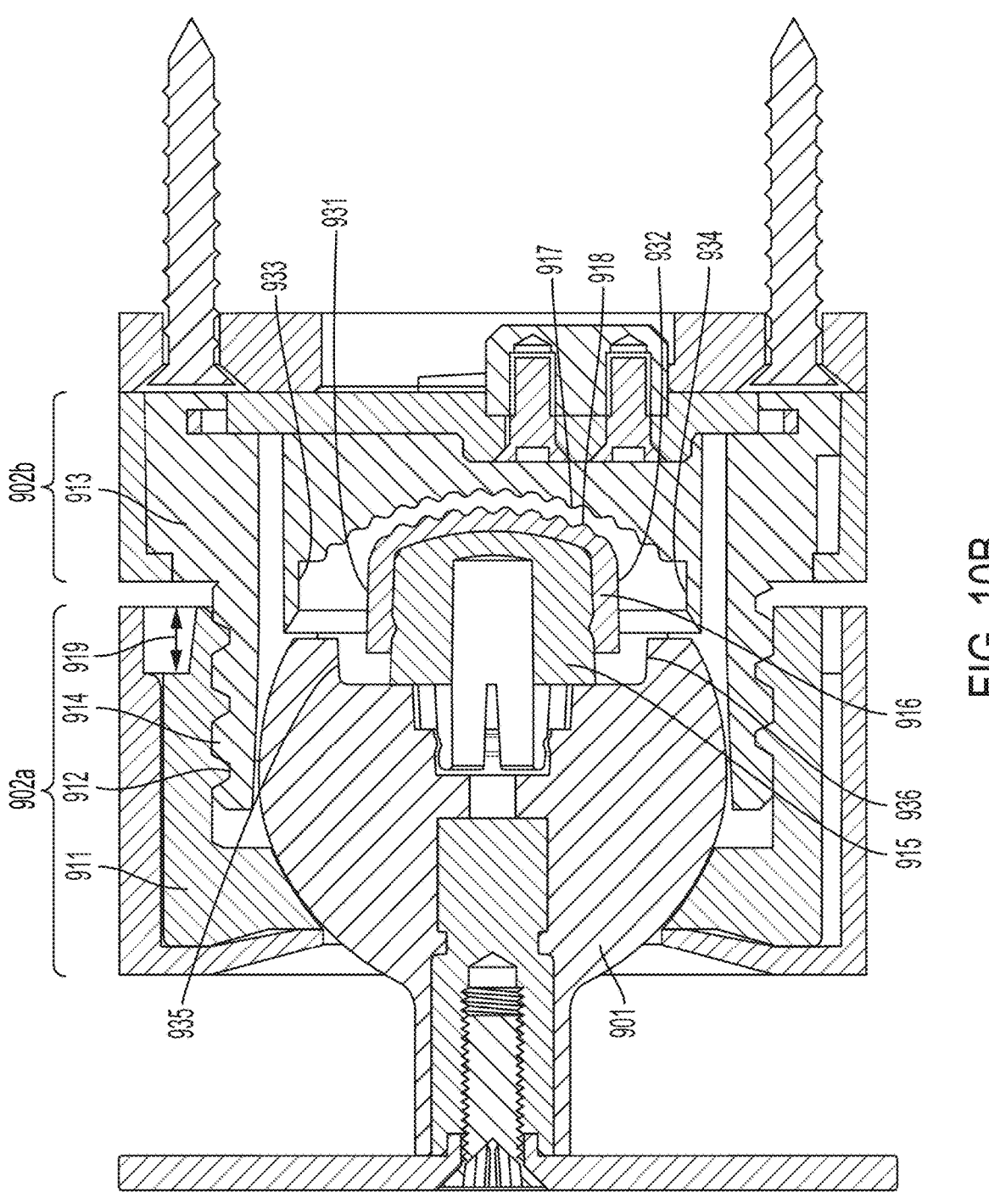
FIG. 10B shows a cross-sectional view of the adjustable mounting assembly of FIG. 10A in a second position.

FIG. 10B demonstrates this capability and illustrates the adjustable mounting assembly 900 after the threaded engagement between the front collar 911 and the rear collar 913 after has been loosened from a first position (shown in FIG. 10A) to a second position. For example, the front housing portion 902a may be rotated about the roll axis of the adjustable mounting assembly 900 such that the thread(s) 912 of the front collar 911 and the thread(s) 914 of the rear collar 913 move the front housing portion 902a away from the rear housing portion 902b. This may create a gap between these parts of the housing 902, as seen at the top and bottom of the adjustable mounting assembly 900 in FIG. 10B.

In addition, a similar gap can be seen within the housing 902 between the opposing sets of teeth 917 and 918, which appears due to the translation of the front, intermediate, and rear body parts to the left along with the front housing portion 902a. For example, when the threaded engagement of the front collar 911 and the rear collar 913 is loosened as shown in FIG. 10B, the weight of the platform 903 and anything that it is supporting may naturally draw the front body part 901 to the left along with the front collar 911. Further, because the intermediate body part 915 is coupled to the front body part 901 as discussed above with the rib 926 within the groove 927, the intermediate body part 915 may be drawn to the left as well. Similarly, because the rear body part 916 is coupled to the intermediate body part 915 as discussed above with the rib 924 within the groove 925, the rear body part 916 may also be drawn to the left, thereby disengaging its teeth 918 from the teeth 917 of the rear collar 913.

In this state, a user may adjust the orientation of the platform 903 and thus the mounted object about any of the rotational axes of the adjustable mounting assembly 900, as movement of the combined front, intermediate, and rear body parts is not constrained in any rotational direction (within certain limits, discussed below). Once a desired orientation is achieved, the threaded engagement between the front collar 911 and the rear collar 913 may be tightened back to the first position shown in FIG. 10A. For instance, the front housing portion 902a may be rotated in the opposite direction about the roll axis of the adjustable mounting assembly 900 such that the thread(s) 912 of the front collar 911 and the thread(s) 914 of the rear collar 913 move the front housing portion 902a back toward the rear housing portion 902b. This, in turn, may reengage the teeth 918 of the rear body part 916 with the teeth 917 of the rear collar 913 (perhaps in a different position that that shown in FIG. 10A).

As suggested above, while the adjustable mounting assembly 900 is a loosened or unlocked position as shown in FIG. 10B, there may be a limit to the amount of rotation that may occur in each of the respective rotational directions. These limits may be imposed by a set of mechanical stops within the housing 902, which will now be discussed.

Beginning with rotation in the pitch direction, the rear body part 916 may include a top edge 931 and a bottom edge 932 as shown in FIG. 10B. When the threaded engagement between the front collar 911 and the rear collar 913 is loosened as shown, the disengagement of the teeth may generally allow for movement of the body parts about the pitch axis. However, once a downward rotation reaches a certain point, the bottom edge 932 of the rear body part 916 may abut an interior bottom wall 934 of the rear collar 913. This may prevent any further downward rotation about the pitch axis and may represent a lower limit in the adjustability of the adjustable mounting assembly 900. For instance, based on this configuration, the adjustable mounting assembly 900 may be adjusted to have a maximum downward pitch angle of 22.5 degrees, although other angles are also possible (e.g., 10 degrees, 20 degrees, etc.).

Similarly, once an upward rotation reaches a certain point, the top edge 931 of the rear body part 916 may abut an interior top wall 933 of the rear collar 913. This may prevent any further upward rotation about the pitch axis and may represent an upper limit in the adjustability of the adjustable mounting assembly 900. Similar to the downward direction, the adjustable mounting assembly 900 may be adjusted to have a maximum upward pitch angle of 22.5 degrees, resulting in a total range of motion of 45 degrees about the pitch axis. Other angles are also possible (e.g., 10 degrees, 20 degrees, etc.), including implementations in which the upward and downward limits are different.

In the discussion above, the interior top wall 933 and the interior bottom wall 934 of the rear collar 913 are referred to separately for the sake of clarity when referring to the cross-sectional view shown in FIG. 10B. However, it will be appreciated that, due to its cylindrical shape, the rear collar 913 may have a single, continuous interior wall.

Figure 11:
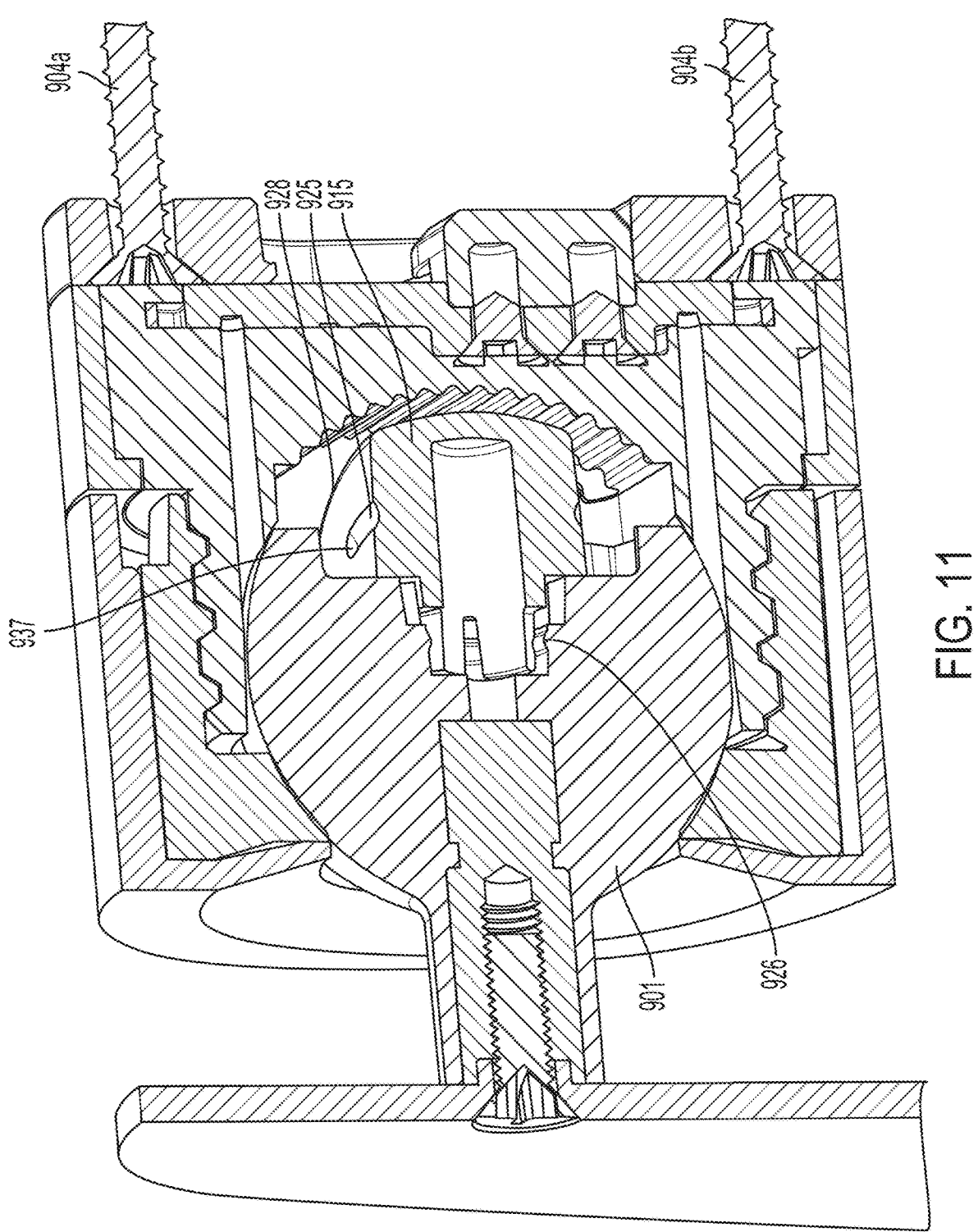
FIG. 11 shows a partially disassembled, perspective view of the adjustable mounting assembly of FIG. 10A.

Turning to FIG. 11, another cross-sectional view of the adjustable mounting assembly 900 is shown from a slight perspective. Further, the rear body part 916 has been removed from FIG. 11 in order to better illustrate certain features. In particular, the groove 925 in the intermediate body part 915 can be seen. As noted above, a corresponding rib 924 on the rear body part 916 engages and slides within the groove 925 in order to permit yaw rotations of the intermediate body part 915 with respect to the rear body part 916. Accordingly, the groove 925 and the rear end 928 of the intermediate body part 915 may be curved with a similar radius about the yaw axis.

As with the pitch rotations, the yaw rotations may be limited by a mechanical stop. In particular, the groove 925 may include a first end wall 937, as well as a second end wall in mirror image position on the other side of the intermediate body part 915 (not shown). In this way, the yaw rotation of the combined front body part and intermediate body part 915 about the yaw axis in a first direction may be limited by an abutment of the rib 924 on the rear body part 916 with the first end wall 937. For instance, based on this configuration, the adjustable mounting assembly 900 may be adjusted to have a maximum yaw angle of 22.5 degrees in a first direction (e.g., right or left), although other angles are also possible (e.g., 10 degrees, 20 degrees, etc.).

In a similar way, rotation may be limited about the yaw axis in a second direction (e.g., right or left) by an abutment of the rib 924 with the second end wall of the groove 925. As above, the adjustable mounting assembly 900 may be adjusted to have a maximum yaw angle of 22.5 degrees in the second direction, resulting in a total range of motion of 45 degrees about the yaw axis. Other angles are also possible (e.g., 10 degrees, 20 degrees, etc.), including implementations in which the limits in the two possible yaw directions are different.

Figure 12:
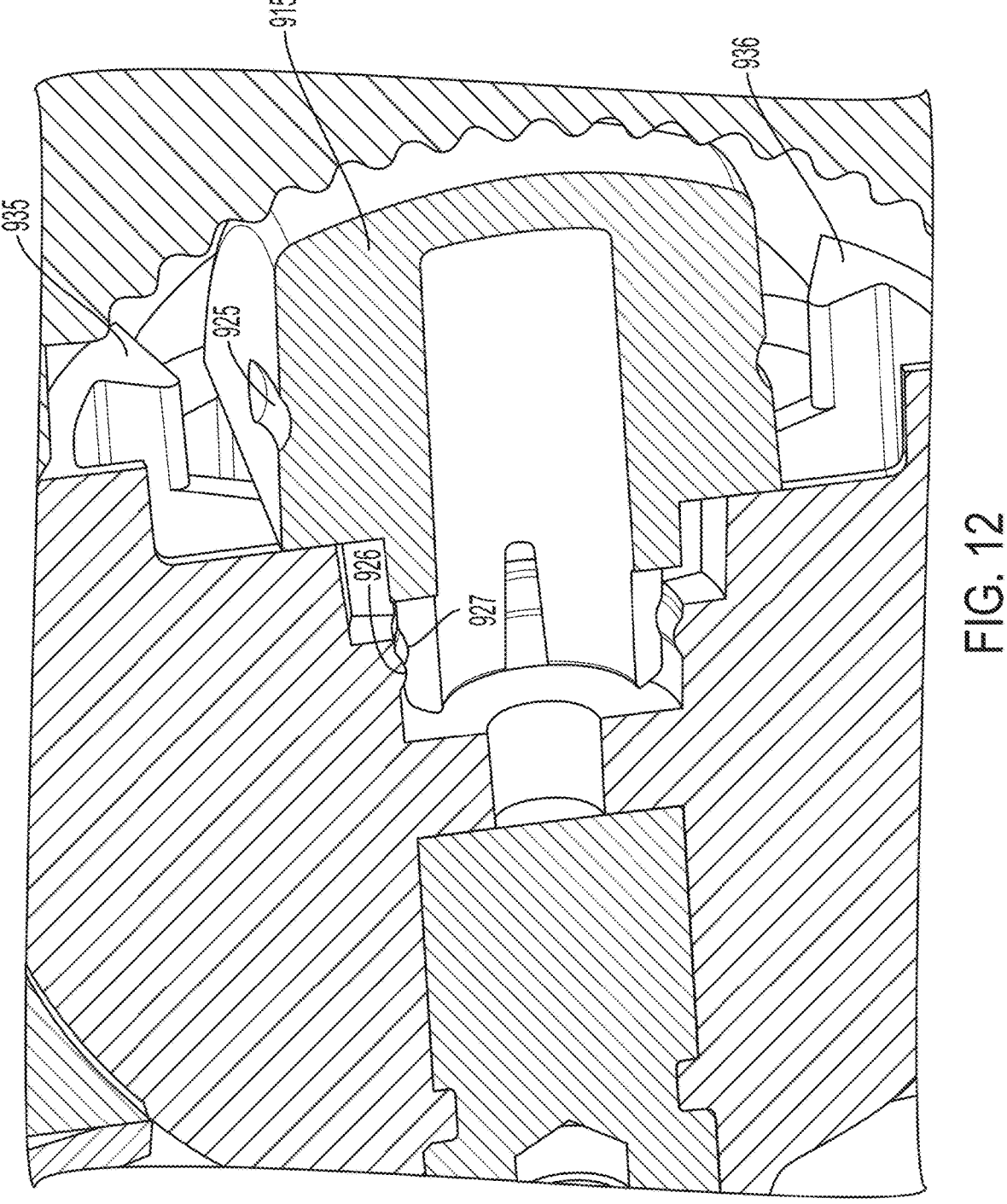
FIG. 12 shows another partially disassembled, perspective view of the adjustable mounting assembly of FIG. 10A.

Referring now to FIG. 12, another cross-sectional view of the adjustable mounting assembly 900 is shown, slightly zoomed in and from a different perspective in order to show the rear side of the front body part 901. Similar to FIG. 11, the rear body part 916 has been removed from FIG. 11 in order to better illustrate certain features. In particular, the front body part 901 includes a first rotation wall stop 935 and a second rotation wall stop 936. Similar to the pitch and yaw limitations discussed above, these stops may serve to limit the rotation of the front body part 901 about the roll axis of the adjustable mounting assembly 900.

For example, when the front body part 901 is rotated about the roll axis in a first direction (e.g., counterclockwise), the rotation may be limited by the abutment of the first wall stop 935 with the top of the intermediate body part 915. For instance, based on this configuration, the adjustable mounting assembly 900 may be adjusted to have a maximum roll angle of 15 degrees in the counterclockwise direction, although other angles are also possible (e.g., 10 degrees, 22.5 degrees, etc.).

In a similar way, rotation may be limited about the roll axis in a second direction (e.g., clockwise) by an abutment of the second wall stop 936 with the bottom of the intermediate body part 915. As above, the adjustable mounting assembly 900 may be adjusted to have a maximum roll angle of 15 degrees in the clockwise direction, resulting in a total range of motion of 30 degrees about the roll axis. Other angles are also possible (e.g., 10 degrees, 22.5 degrees, etc.), including implementations in which the limits in the two possible roll directions are different. Further, the limitation on the angle of roll rotation may be implemented in other ways as well, include more or fewer (e.g., one) rotation wall stops on the front body part 901.

Figure 13:
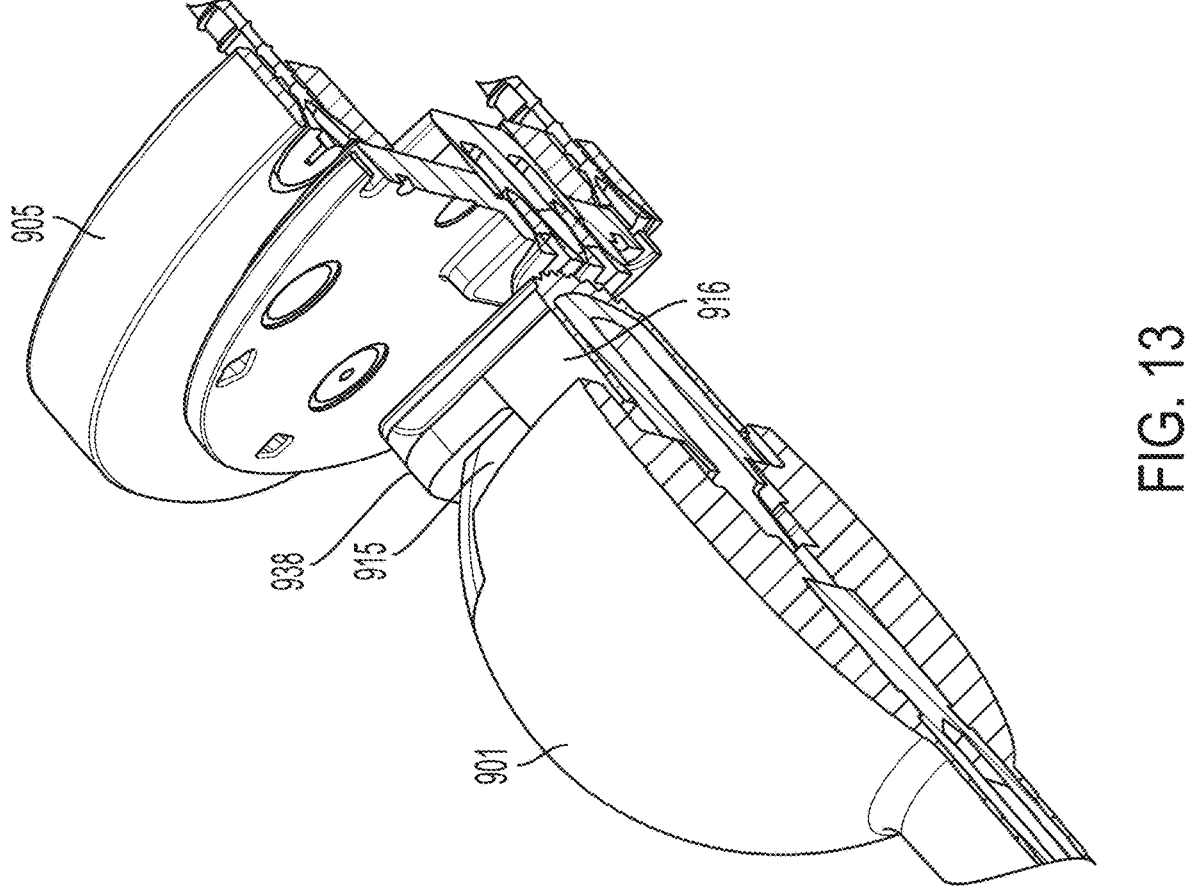
FIG. 13 shows another partially disassembled, perspective view of the adjustable mounting assembly of FIG. 10A.

FIG. 13 shows another cross-sectional view of the adjustable mounting assembly 900 from a more top-down perspective. In FIG. 13, the front cover 921 and the rear cover 922 are not shown, nor are the front collar 911 or the rear collar 913, in order to better illustrate certain features. In particular, the front body part 901, the intermediate body part 915, and the rear body part 916 are shown in relation to the mounting bracket 905. A side wall 938 of the rear body part 916 can also be seen in FIG. 13, which may abut an interior side wall of the rear collar 913 when fully assembled. In view of this arrangement and the discussion above, it will be appreciated that the abutment of the side wall 938 of the rear body part 916 and the interior side wall of the rear collar 913 prevents the rear body part 916 from rotating about the yaw axis when the rib 924 of the rear body part 916 is sliding within the groove 925 of the intermediate body part 915. Further, the abutment of the side wall 938 of the rear body part 916 and the interior side wall of the rear collar 913 also prevents the rear body part 916 (and by extension, the intermediate body part 915) from rotating about the roll axis when the rib 926 of the front body part 901 is sliding within the groove 927 of the intermediate body part 915. Nonetheless, the side wall 938 of the rear body part 916 is free to slide vertically with respect to the interior side wall of the rear collar 913 when the combined front, intermediate, and rear body parts are rotated in the pitch direction (when the threaded engagement is loosened). Because the yaw and roll rotations are limited in this way, the teeth 918 of the rear body part 916 may remain aligned with the teeth 917 of the rear collar 913 such that they can be easily interlocked when the threaded engagement is tightened.

Referring again to FIGS. 10A-10B, it may be desirable to limit the separation of the front housing portion 902*a* and the rear housing portion 902*b* when the threaded engagement of the front collar 911 and the rear collar 913 is loosened to the second position shown in FIG. 10B, and/or when the threaded engagement is tightened to the first position shown in FIG. 10A. For example, it may be desirable to limit loosening the front collar 911 from the rear collar 913 to the point that the housing 902 can be fully disassembled, which may cause the body parts in the interior of the housing 902 to fall out. Additionally, or alternatively, it may be desirable to limit tightening the front collar 911 from the rear collar 913 to avoid over-tightening and damaging the adjustable mounting assembly 900. To accomplish this, the front collar 911 may include a channel 919 positioned adjacent to the rear collar 913, shown in FIG. 10B along the top of the front collar 911, inside the front cover 921.

Figure 14:
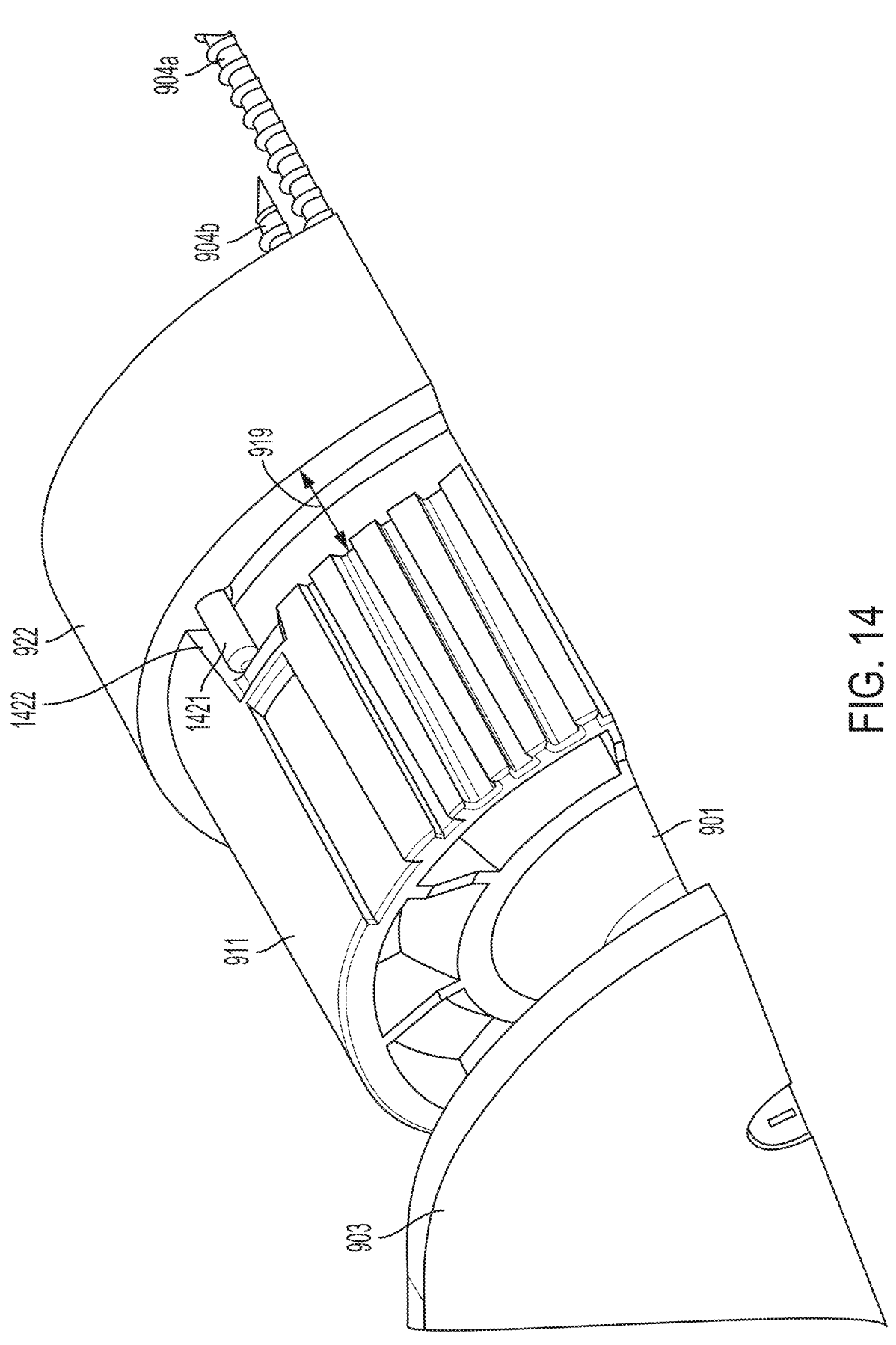
FIG. 14 shows another partially disassembled, perspective view of the adjustable mounting assembly of FIG. 10A.

Turning now to FIG. 14, the same channel 919 can be seen in another cross-sectional view of the adjustable mounting assembly 900 from a more top-down perspective, where the front cover 921 is not shown so as to reveal the front collar 911. The channel 919 includes a first end wall 1422 and may additionally include a second end wall in a similar position on the opposite side of the front collar 911 (not shown). Further, the adjustable mounting assembly 900 may include a limiter pin 1421 that extends through the rear collar 913 and into the channel 919 such that, when the threaded engagement between the front collar 911 and the rear collar 913 is tightened (e.g., rotated clockwise) to the first position, the limiter pin 1421 engages the first end wall 1422 of the channel 919 and prevents further tightening of the threaded engagement between the front collar 911 and the rear collar 913. Moreover, if the overall shape of the housing 902 is an oblong shape as shown in FIGS. 9-14, or some other non-concentrically-symmetrical design, the interaction of the limiter pin 1421 and the first end wall 1422 of the channel 919 may also ensure that the front housing portion 902*a* and rear housing portion 902*b* are substantially aligned when the threaded engagement between the front collar 911 and the rear collar 913 is tightened.

A second end wall of the channel 919 may operate in a similar way. For instance, as the front housing portion 902*a* is rotated counterclockwise to loosen the threaded engagement between the front collar 911 and the rear collar 913, the limiter pin 1421 may travel within the channel until the second end wall of the channel 919 abuts the limiter pin 1421. As indicated above, this may prevent accidental disassembly of the entire adjustable mounting assembly 900. Various other configurations are also possible.

In the discussion above, it should be understood that the features described and shown in the figures represent one possible implementation of the adjustable mounting assembly 900, and that other substantially similar configurations are also possible. For instance, where two parts are engaged via a rib and a corresponding groove, the rib and groove may be swapped between the parts to produce the same effect. Similarly, any function that is discussed as being performed by a single part may be performed by two or more parts working in unison. Further, two or more of the parts discussed above may be combined into a single part, where appropriate. Numerous other variations are also possible.

Turning now to FIG. 15, a process 1500 for adjusting an adjustable mounting assembly is shown, according to an example implementation. For purposes of discussed in the following examples, the process 1500 shown in FIG. 15 will be discussed in relation to the adjustable mounting assembly 900 as shown in FIGS. 9-14. Alternative implementations are included within the scope of the examples of the present disclosure, in which functions may be executed out of order from that shown or discussed, including substantially concurrently, depending on the functionality involved, as would be understood by those reasonably skilled in the art.

At block 1502 of the process 1500 may involve loosening the threaded engagement between the front collar 911 and the rear collar 913 from a first position, as shown in FIG. 10A, to a second position, as shown in FIG. 10B, thereby disengaging the teeth 918 of the rear body part 916 from the teeth 917 of the rear collar 913 and allowing the front body part 901 to rotate about a pitch axis of the adjustable mounting assembly 900.

At block 1504 of the process 1500, after loosening the threaded engagement to the second position, the process may involve rotating at least the front body part 901 about the pitch axis of the adjustable mounting assembly 900. For example, as discussed above, a user may manually adjust the position of the platform 903 and thus the mounted object to a desired orientation.

At block 1506 of the process 1500, after rotating at least the front body part 901 about the pitch axis, the process may involve tightening the threaded engagement between the front collar 911 and the rear collar 913 from the second position to the first position, thereby positioning the teeth 918 of the rear body part 916 in an interlocking engagement with the teeth 917 of the rear collar 913 and preventing the front body part 901 from rotating about the pitch axis.

In view of the discussion above, it will be appreciated that, although rotation about the pitch axis is prevented when the threaded engagement between the front collar 911 and the rear collar 913 is tightened due to the interlock of the teeth 917 and 918, rotations in the roll and yaw directions might still be possible. For example, the tightening of the front collar 911 toward the rear collar 913 might not be so tight as to prevent (e.g., via friction) relative movements of the rib 926 of the front body part 901 within the groove 927 of the intermediate body part 915, which is all that is required to effect a rotation about the roll axis. The same may be true of relative movements of the rib 924 of the rear body part 916 within the groove 925 of the intermediate body part 915, which is all that is required to effect a rotation about the yaw axis. In these implementations, two of three types of rotations (i.e., roll and yaw) may be accomplished after the pitch level is set and the threaded engagement of the adjustable mounting assembly 900 is tightened.

Alternatively, in some other implementations, the tightening of the threaded engagement between the front collar 911 and the rear collar 913 may snug the front, intermediate, and rear body parts together tightly enough within the housing 902 that friction may prevent the relative movements discussed above. Accordingly, in these implementations, adjustments in all rotational directions must be made prior to tightening the threaded engagement of the adjustable mounting assembly 900.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The description of the different advantageous arrangements has been presented for purposes of illustration and description and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A system comprising an adjustable mounting assembly, the adjustable mounting assembly comprising:

a housing comprising a front collar and a rear collar joined by a threaded engagement, the front collar comprising an opening about a roll axis of the adjustable mounting assembly, the rear collar comprising teeth oriented toward the front collar;

a front body part positioned within the housing and extending outwardly through the opening;

an intermediate body part positioned within the housing and rotatably coupled, about the roll axis of the adjustable mounting assembly, to the front body part; and a rear body part positioned within the housing and rotatably coupled, about a yaw axis of the adjustable mounting assembly, to the intermediate body part, the rear body part comprising teeth oriented toward the rear collar, wherein the adjustable mounting assembly is adjustable such that:

when the threaded engagement between the front collar and the rear collar is tightened to a first position, the teeth of the rear body part are positioned in an interlocking engagement with the teeth of the rear collar, thereby preventing the front body part from rotating about a pitch axis of the adjustable mounting assembly; and when the threaded engagement between the front collar and the rear collar is loosened to a second position, the front collar translates away from the rear collar causing a gap to form that enables the teeth of the rear body part to be disengageable from the teeth of the rear collar, thereby allowing the front body part to rotate about the pitch axis of the adjustable mounting assembly.

2. The system of claim 1, wherein the front body part comprises a rib sized to engage a groove of the intermediate body part, wherein the rib of the front body part is slidable within the groove of the intermediate body part when the front body part is rotated about a roll axis of the adjustable mounting assembly.

3. The system of claim 1, wherein the intermediate body part comprises a groove sized to engage a rib of the rear body part, wherein the rib of the rear body part is slidable within the groove of the intermediate body part when the front body part is rotated about a yaw axis of the adjustable mounting assembly.

4. The system of claim 3, wherein the groove comprises a first end wall and a second end wall, wherein rotation of the front body part about the yaw axis is limited in a first direction by an abutment of the first end wall of the groove with the rib of the rear body part, and wherein rotation of the front body part about the yaw axis is limited in a second direction by an abutment of the second end wall of the groove with the rib of the rear body part.

5. The system of claim 4 wherein rotation of the front body part about the yaw axis is limited to 22.5 degrees in either of the first direction or the second direction.

6. The system of claim 1, wherein the front collar comprises a channel positioned adjacent to the rear collar, the channel including at least one end wall, the adjustable mounting assembly further comprising:

a limiter pin extending through the rear collar and into the channel such that, when the threaded engagement between the front collar and the rear collar is tightened to the first position, the limiter pin engages the end wall of the channel and prevents further tightening of the threaded engagement between the front collar and the rear collar.

7. The system of claim 1, wherein the rear body part comprises a top edge and a bottom edge, and wherein, when the threaded engagement between the front collar and the rear collar is loosened to the second position, rotation of the front body part about the pitch axis is limited in a first direction by an abutment of the top edge of the rear body part with an interior top wall of the rear collar, and rotation of the front body part about the pitch axis is limited in a second direction by an abutment of the bottom edge of the rear body part with an interior bottom wall of the rear collar.

8. The system of claim 7, wherein rotation of the front body part about the pitch axis, when the threaded engagement between the front collar and the rear collar is loosened to the second position, is limited to 22.5 degrees in either of the first direction or the second direction.

9. The system of claim 1, wherein the front body part comprises a first rotation stop wall and a second rotation stop wall, and wherein rotation of the front body part about the roll axis is limited in a first direction by an abutment of the first rotation stop wall with the intermediate body part, and rotation of the front body part about the roll axis is limited in a second direction by an abutment of the second rotation stop wall with the intermediate body part.

10. The system of claim 9, wherein rotation of the front body part about the roll axis is limited to 15 degrees in either of the first direction or the second direction.

11. The system of claim 1, wherein the front collar comprises an interior bearing surface surrounding the opening, and wherein the front body part comprises:

a spherical front face shaped to abut the interior bearing surface of the front collar; and a stem that extends radially outward from the spherical front face at the opening of the front collar.

12. The system of claim 11, wherein the stem is coupled to a platform for receiving a playback device.

13. The system of claim 1, further comprising:

a playback device; and a mounting interface for removably coupling the playback device to the front body part of the adjustable mounting assembly, the playback device comprising;

at least one orientation sensor;

at least one processor;

a non-transitory computer-readable medium; and program instructions stored on the non-transitory computer-readable medium that are executable by the at least one processor such that the playback device is configured to:

obtain, via the at least one orientation sensor, orientation data for the playback device;

based on the obtained orientation data, determine that at least one of (i) a rotation of the playback device about a roll axis of the playback device exceeds a first threshold rotation or (ii) a rotation of the playback device about a pitch axis of the playback device exceeds a second threshold rotation; and based on determining that the rotation of the playback device exceeds at least one of the first threshold rotation or the second threshold rotation, transition from operating in a valid orientation mode in which the playback device is allowed to play back audio content to operating in an invalid orientation mode in which the playback device is restricted from playing back audio content.

14. The system of claim 13, wherein the program instructions that are executable by the at least one processor such that the playback device is configured to transition from operating in the valid orientation mode to operating in the invalid orientation mode comprise program instructions that are executable by the at least one processor such that the playback device is configured to:

update a state variable to indicate the invalid orientation mode; and cause a visual interface of the playback device to display an indication of the invalid orientation mode.

15. The system of claim 13, wherein the playback device weighs at least 8 pounds.

16. The system of claim 1, further comprising:

a mounting bracket removably coupled to an exterior side of the rear collar, the mounting bracket comprising one or more openings to receive respective fasteners for attaching the mounting bracket to a mounting surface.

17. A method of adjusting an adjustable mounting assembly, the adjustable mounting assembly comprising:

a housing comprising a front collar and a rear collar joined by a threaded engagement, the front collar comprising an opening about a roll axis of the adjustable mounting assembly, the rear collar comprising teeth oriented toward the front collar;

a front body part positioned within the housing and extending outwardly through the opening;

an intermediate body part positioned within the housing and rotatably coupled, about the roll axis of the adjustable mounting assembly, to the front body part; and a rear body part positioned within the housing and rotatably coupled, about a yaw axis of the adjustable mounting assembly, to the intermediate body part, the rear body part comprising teeth oriented toward the rear collar;

the method comprising:

loosening the threaded engagement between the front collar and the rear collar from a first position to a second position, thereby causing the front collar to translate away from the rear collar, which causes a gap to form that (i) enables disengagement of the teeth of the rear body part from the teeth of the rear collar and (ii) allows the front body part to rotate about a pitch axis of the adjustable mounting assembly;

after loosening the threaded engagement to the second position, rotating at least the front body part about the pitch axis of the adjustable mounting assembly; and after rotating at least the front body part about the pitch axis, tightening the threaded engagement between the front collar and the rear collar from the second position to the first position, thereby positioning the teeth of the rear body part in an interlocking engagement with the teeth of the rear collar and preventing the front body part from rotating about the pitch axis.

18. The method of claim 17, wherein the front collar comprises an interior bearing surface surrounding the opening, and wherein the front body part comprises (i) a spherical front face shaped to abut the interior bearing surface of the front collar and (ii) a stem that extends radially outward from the spherical front face through the opening of the front collar, the stem coupled to a platform for receiving an audio playback device, the method further comprising:

attaching a playback device weighing at least 8 pounds to the platform.

19. The method of claim 17, further comprising:

after loosening the threaded engagement, but before tightening the threaded engagement, rotating at least the front body part about the yaw axis of the adjustable mounting assembly.

20. The method of claim 19, wherein the rear body part comprises a rib that is slidably engaged within a groove of the intermediate body part, wherein the groove comprises a first end wall, and wherein rotating at least the front body part about the yaw axis of the adjustable mounting assembly comprises rotating the front body part and the intermediate body part until the rib of the rear body part abuts the first end wall of the groove of the intermediate body part.

* * * * *